(12) United States Patent
Schuster et al.

(10) Patent No.: US 10,964,997 B2
(45) Date of Patent: Mar. 30, 2021

(54) TECHNOLOGIES FOR LONG-LIVED 3D MULTIMODE MICROWAVE CAVITIES

(71) Applicant: The University of Chicago, Chicago, IL (US)

(72) Inventors: David Schuster, Chicago, IL (US); Ravi Naik, Berkeley, CA (US); Srivatsan Chakram, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 107 days.

(21) Appl. No.: 16/352,191

(22) Filed: Mar. 13, 2019

(65) Prior Publication Data

US 2019/0288367 A1    Sep. 19, 2019

Related U.S. Application Data

(60) Provisional application No. 62/642,514, filed on Mar. 13, 2018.

(51) Int. Cl.
| | |
|---|---|
| *H01P 7/06* | (2006.01) |
| *H01P 1/30* | (2006.01) |
| *H01P 1/16* | (2006.01) |
| *G06N 10/00* | (2019.01) |

(52) U.S. Cl.
CPC ............... *H01P 7/06* (2013.01); *G06N 10/00* (2019.01); *H01P 1/16* (2013.01); *H01P 1/30* (2013.01)

(58) Field of Classification Search
CPC .................. H01P 7/06; H01P 1/16; H01P 1/30

USPC ......................................... 333/208, 219, 222
See application file for complete search history.

(56) References Cited

U.S. PATENT DOCUMENTS

2008/0164874 A1* 7/2008 White ................... G01N 24/08
324/316

OTHER PUBLICATIONS

Naik et al., "Random access quantum information processors," arXiv 1705.00579, dated May 1, 2017.
Reagor et al., "Quantum memory with millisecond coherence in circuit QED," Physical Review B 94, 014506 (2016).

* cited by examiner

*Primary Examiner* — Rakesh B Patel
(74) *Attorney, Agent, or Firm* — Barnes & Thornburg LLP

(57) ABSTRACT

Technologies for a long-lived 3D multimode microwave cavity are disclosed. In the illustrative embodiment, a series of overlapping holes are drilled into a monolithic block of aluminum forming a cavity. The dimensions of the cavity formed by the overlapping holes can be made long by drilling a long series of holes in a row and can be made high by drilling holes a certain depth into the cavity. If two dimensions of the cavity are bigger than the diameter of the holes used to create the cavity, then the cavity can support electromagnetic waves that cannot propagate through the holes, leading to a long lifetime in the cavity. A superconducting qubit or other non-linear element can be inserted into the cavity, which can controllably interact with each of several modes of the cavity. In this way, the modes of the cavity can act as components in a quantum memory.

20 Claims, 17 Drawing Sheets

TECHNOLOGIES FOR LONG-LIVED 3D MULTIMODE MICROWAVE CAVITIES

CROSS-REFERENCE TO RELATED APPLICATIONS

The present application claims the benefit of U.S. provisional patent application No. 62/642,514, filed Mar. 13, 2019, by David Schuster, Ravi Naik, and, Srivatsan Chakram, entitled "TECHNOLOGIES FOR LONG-LIVED 3D MULTIMODE MICROWAVE CAVITIES."

BACKGROUND

Quantum computing promises advances in solving problems that cannot be addressed with a classical computer, such as performing specific algorithms to efficiently solve certain problems, including, for example, factoring large numbers and performing simulations of large quantum systems. Superconducting quantum computing is a promising candidate, having demonstrated high-fidelity one- and two-qubit gates.

Like all quantum computing systems, a superconducting quantum computing system requires storage of qubits with low loss and small amounts of noise. Many proposals have been made, but the loss and noise present in superconducting quantum memories remains a limiting factor in superconducting quantum computing systems.

SUMMARY

According to one aspect of the disclosure, a device for supporting electromagnetic modes is disclosed. The device comprises a resonator comprising a monolithic block, a cavity that is defined in the monolithic block, and a port that opens into the cavity. The port is configured to receive a coupling element that is able to be coupled to a plurality of electromagnetic modes supported by the cavity. The cavity is defined between a number of seamless sidewalls.

In some embodiments, the device may further comprise the coupling element. The coupling element may be a non-linear element inserted into the port.

In some embodiments, the non-linear element may be a superconducting qubit.

In some embodiments, the non-linear element may be a tunable resonator.

In some embodiments, a first hole extending transverse to the cavity may be defined in the monolithic block, and a second hole extending transverse to the cavity may be defined in the monolithic block. The second hole may include an inner end that overlaps with an inner end of the first hole.

In some embodiments, a first plurality of holes extending transverse to the cavity in a first direction may be defined in the monolithic block, and a second plurality of holes extending transverse to the cavity in a second direction different from the first direction may be defined in the monolithic block. Each hole of the second plurality of holes may include an inner end that overlaps with an inner end of an adjacent hole of the first plurality of holes.

In some embodiments, the cavity may extend from a first end to a second end, and a first dimension of the cavity may be defined between the first end and the second end. A depth of the first and second plurality of holes into the cavity may decrease from the first end to the second end.

In some embodiments, the cavity may extend from a first end to a second end and a first dimension of the cavity may be defined between the first end and the second end. The cavity may have a second dimension that is defined at the first end orthogonal to the first dimension, and each of the first dimension and the second dimension may be bigger than the diameter of any of the first plurality of holes or second plurality of holes.

In some embodiments, a quality factor of at least one of the plurality of electromagnetic modes may be at least ten million.

In some embodiments, the monolithic block may be at a temperature less than a superconducting temperature of the monolithic block.

In some embodiments, the monolithic block may be at a temperature such that there is an average of less than one thermal photon in the lowest-frequency mode supported by the cavity.

In some embodiments, the monolithic block may be aluminum.

In some embodiments, the monolithic block may be at least 99.99% pure aluminum.

In some embodiments, the monolithic block may be one of niobium, copper, titanium nitride, niobium-titanium alloy, niobium titanium nitride, indium, lead, tin, lead-tin alloy, and rhenium.

In some embodiments, the resonator may further comprise a plurality of additional cavities, a bus cavity, and a plurality of superconducting qubits. Each superconducting qubit of the plurality of superconducting qubits may be positioned such that it is able to be coupled to both (i) one or more electromagnetic modes of a corresponding additional cavity of the plurality of additional cavities and (ii) one or modes of the bus cavity.

In some embodiments, the device may further comprise a film of material on the monolithic block.

In some embodiments, the monolithic block may not be superconducting at any temperature and the film of material may be superconducting when below a superconducting temperature.

In some embodiments, the monolithic block may be oxygen-free high thermal conductivity copper and the film of material may be one of titanium nitride, niobium titanium nitride, indium, lead, lead-tin allow, rhenium or rhenium, gold, and copper multilayers.

According to another aspect, a method of manufacturing a resonator is disclosed. The method comprises creating, in a monolithic block, one or more first holes from a first surface of the monolithic block such that each of the one or more first holes extends from the first surface to an end of the corresponding hole and creating, in the monolithic block, one or more second holes from a second surface of the monolithic block such that each of the one or more second holes overlaps with at least one hole of the one or more first holes to create a cavity in the monolithic block. The cavity extends from a first end to a second end and a first dimension of the cavity is defined between the first end and the second end, and the cavity has a second dimension that is defined at the first end orthogonal to the first dimension. Each of the first dimension and the second dimension is bigger than the diameter of any of the first plurality of holes or second plurality of holes.

In some embodiments, creating the one or more first holes from the first surface may comprise creating a plurality of first holes in a first direction from the first surface, and creating the one or more second holes from the second surface may comprise creating a plurality of second holes in a second direction different from the first from the second surface.

In some embodiments, the method may further comprise creating one or more third holes in a third direction different from the first and second from a third surface.

In some embodiments, creating the plurality of first holes and the plurality of second holes may comprise controlling one or more parameters of each of the plurality of first holes and each of the plurality of second holes to control a spectrum of modes supported in the cavity.

In some embodiments, controlling the one or more parameters of each of the plurality of first holes and each of the plurality of second holes may comprise controlling a depth of each of the plurality of first holes and of each of the plurality of second holes such that a height of the cavity decreases from the first end to the second end.

In some embodiments, controlling the one or more parameters of each of the plurality of first holes and each of the plurality of second holes may comprise controlling a depth of each of the plurality of first holes and of each of the plurality of second holes such that a height of the cavity decreases from the first end to the second end at a rate proportional to the distance from the first end.

In some embodiments, the method may further comprise creating a plurality of holes in the monolithic block. Each of the plurality of holes may comprise an outer end that does not overlap with any other hole of the plurality of holes and an inner end that overlaps with an inner end of one or more of the plurality of holes. The overlapping inner ends of the plurality of holes may form a volume that is approximately cylindrical.

In some embodiments, the method may further comprise creating a plurality of holes in the monolithic block. Each of the plurality of holes may comprise an outer end that does not overlap with any other hole of the plurality of holes and an inner end that overlaps with an inner end of one or more of the plurality of holes. The overlapping inner ends of the plurality of holes may form a volume that extends from the first end to the second end and surrounds a center core. The center core may form an inner conductor of a coaxial cavity.

In some embodiments, the cavity supports a plurality of electromagnetic modes at a plurality of wavelengths, and a quality factor of at least one of the electromagnetic modes may be at least ten million.

In some embodiments, the method may further comprise inserting a non-linear element into the cavity and performing a two-qubit operation on two modes of the cavity by controlling parameters of the non-linear element.

In some embodiments, the non-linear element may be a superconducting qubit.

In some embodiments, the non-linear element may be a tunable resonator.

In some embodiments, the method may further comprise cooling the monolithic block to a temperature less than a superconducting temperature of the monolithic block.

In some embodiments, the method may further comprise cooling the monolithic block to a temperature such that there is an average of less than one thermal photon in the lowest-frequency mode supported by the cavity.

In some embodiments, the monolithic block may be aluminum.

In some embodiments, the monolithic block may be at least 99.99% pure aluminum.

In some embodiments, the method may further comprise creating, in the monolithic block, a plurality of additional cavities in the same manner as the cavity and creating, in the monolithic block, a bus cavity in the same manner as the cavity. The method may further comprise creating, in the monolithic block, a port for each additional cavity of the plurality of additional cavities connecting the corresponding additional cavity to the bus cavity and inserting, in each port corresponding to an additional cavity of the plurality of additional cavities, an additional superconducting qubit such that the additional qubit is coupled to both one or more electromagnetic modes of the corresponding additional cavity of the plurality of additional cavities and one or modes of the bus cavity.

According to another aspect, a device for supporting electromagnetic modes is disclosed. The device comprises a resonator comprising a monolithic block, a cavity that may be defined in the monolithic block, and a port that opens into the cavity. The port is configured to receive a coupling element that is able to be coupled to a plurality of electromagnetic modes supported by the cavity. The cavity is defined between a number of sidewalls. A first plurality of holes extending transverse to the cavity in a first direction is defined in the monolithic block, and a second plurality of holes extending transverse to the cavity in a second direction different from the first direction is defined in the monolithic block. Each hole of the second plurality of holes includes an inner end that overlaps with an inner end of an adjacent hole of the first plurality of holes.

In some embodiments, a quality factor of at least one of the electromagnetic modes of the plurality of electromagnetic waves may be at least ten million.

In some embodiments, the resonator further may comprise a plurality of additional cavities, a bus cavity, and a plurality of additional superconducting qubits. Each additional superconducting qubit of the plurality of superconducting qubits may be positioned such that it is able to be coupled to both one or more electromagnetic modes of a corresponding additional cavity of the plurality of additional cavities and one or modes of the bus cavity.

According to another aspect, a system for supporting electromagnetic modes in a plurality of cavities is disclosed. The system comprises one or more resonators comprising the plurality of cavities defined in the one or more resonator and a bus cavity defined in the one or more resonators. Each of the plurality of cavities and the bus cavity support a corresponding plurality of electromagnetic modes. The system further comprises a plurality of non-linear elements. Each non-linear element of the plurality of non-linear elements is coupled to one of the plurality of cavities and to the bus cavity.

In some embodiments, the one or more resonators may comprise one resonator comprising a monolithic block. Each of the plurality of cavities and the bus cavity may be defined in the monolithic block.

In some embodiments, a frequency of each of the plurality of electromagnetic modes of the bus cavity may not overlap with a frequency of any of the electromagnetic modes of the pluralities of electromagnetic modes of the plurality of cavities.

In some embodiments, each non-linear element of the plurality of non-linear elements may be a superconducting qubit.

In some embodiments, each non-linear element of the plurality of non-linear elements may be a tunable resonator.

BRIEF DESCRIPTION OF THE DRAWINGS

The detailed description particularly refers to the following figures, in which.

DETAILED DESCRIPTION OF THE DRAWINGS

Figure 1:
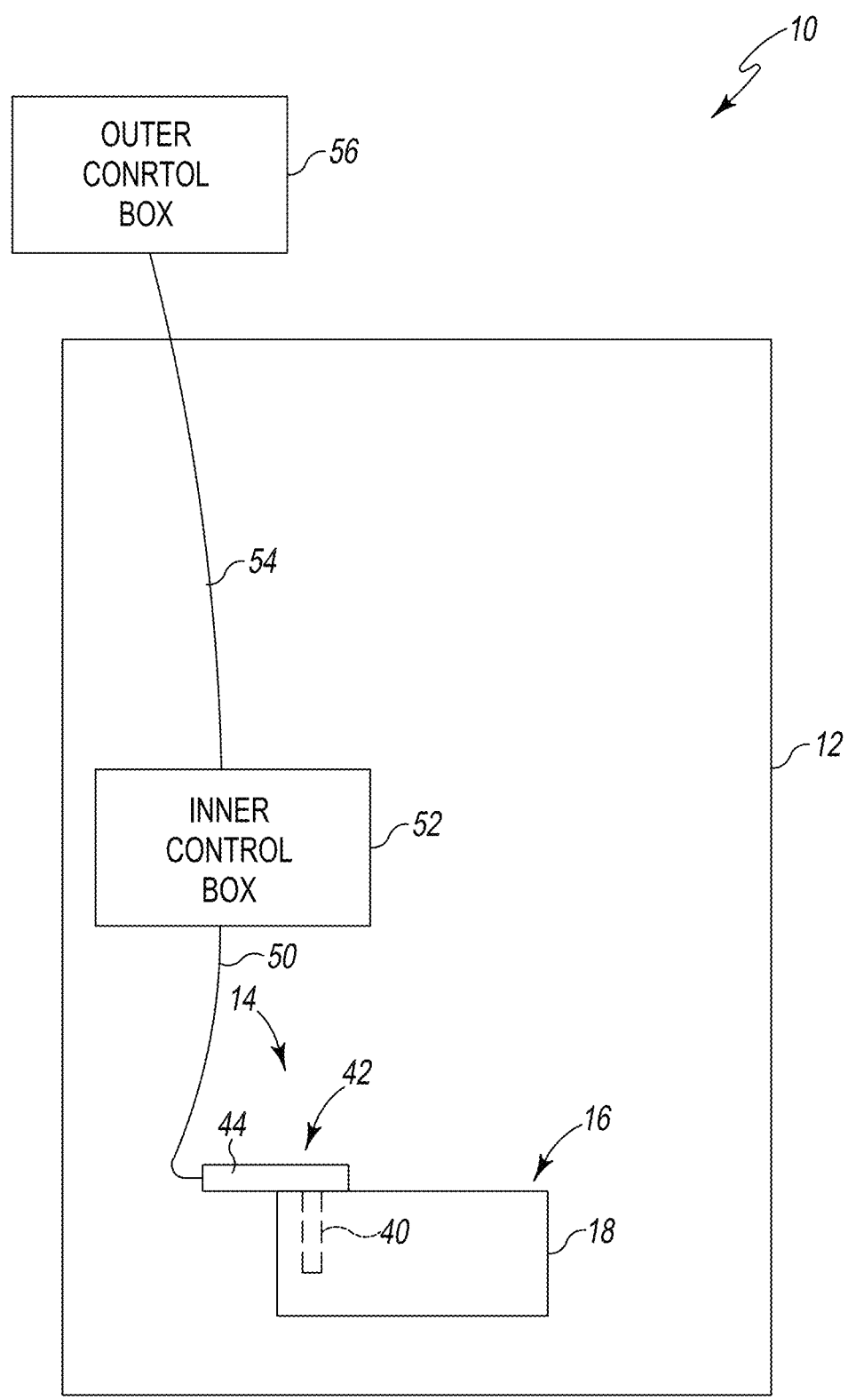
FIG. 1 is a simplified block diagram of a system of a superconducting quantum computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 10 for performing superconducting quantum computing operations includes a refrigerator 12, which has a quantum computer element 14 positioned inside of it. It should be appreciated that, as used herein, the term "quantum computer element" refers to an element that is able to be used to perform quantum computing operations, such as preparation, manipulation, or measurement of a qubit, but does not necessarily need to be a component in a fully-functional quantum computing and need not include a physical qubit.

The illustrative quantum computer element 14, as described in more detail below, includes a resonator 16 formed from a monolithic block 18 of material such as aluminum that supports multiple long-lived 3D electromagnetic modes at microwave frequencies. For example, the long-lived modes may have a quality factor of over 10 million. In the illustrative embodiment, the resonator 16 includes a seamless cavity 20 (see FIG. 3) that is defined in the monolithic block 18. As used herein, the term "seam" refers to a joint that is formed at the joining of two separate blocks of material, such as by mating the blocks together through application of physical force, welding, soldering, and/or the like. A "seamless" structure should be understood to refer to a single, continuous structure that is devoid of any seams. It should be appreciated that the resonator 16 as described in FIGS. 2-6 is seamless even though it has holes in it because it is created from a monolithic block.

Figure 2:
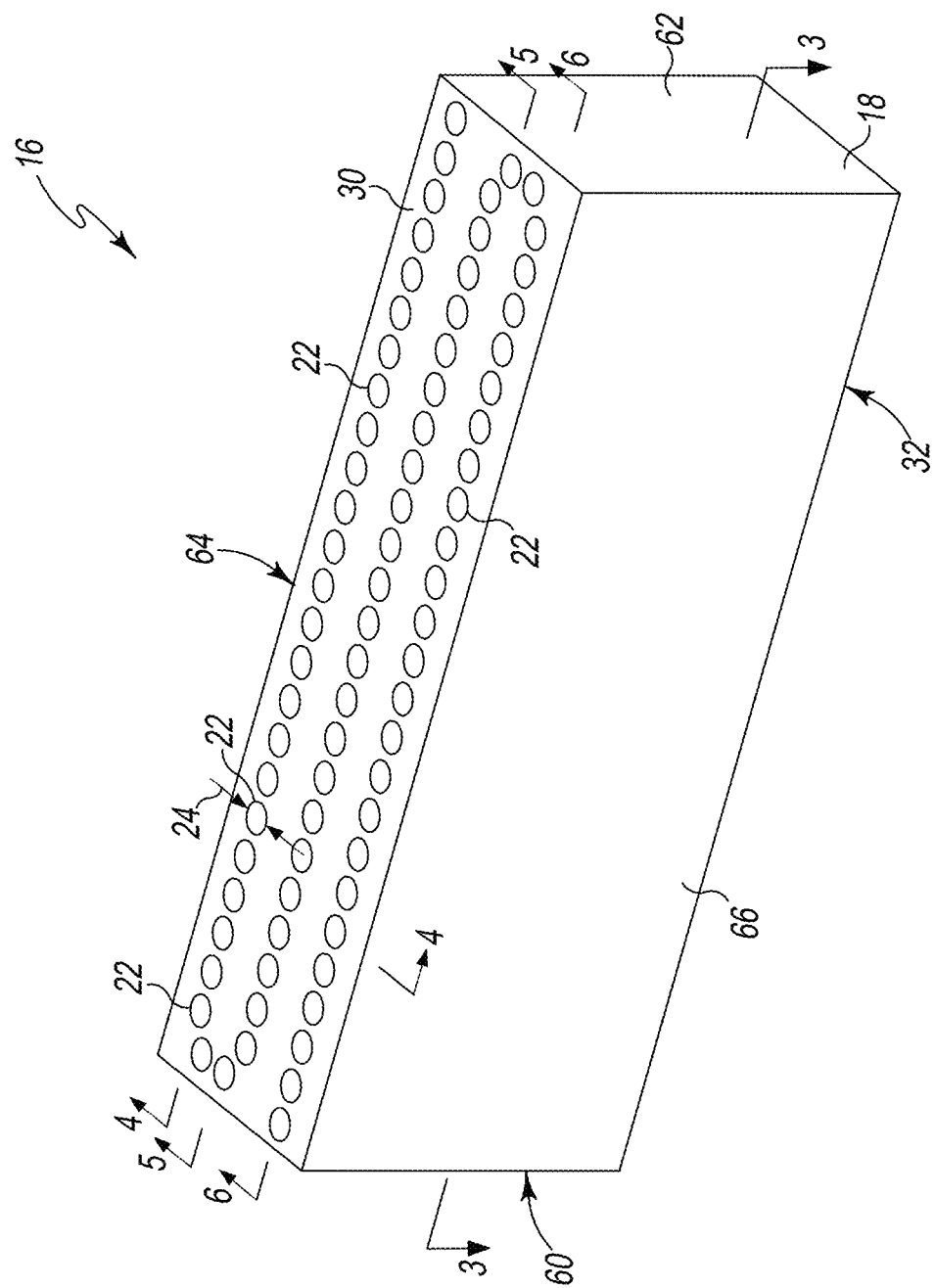
FIG. 2 is a perspective view of a resonator of the superconducting quantum computing device of FIG. 1.

As shown in FIG. 2, the resonator 16 includes a plurality of transverse holes 22 that open into the cavity 20. The holes 22 are arranged in a number of parallel rows extending from one end of the block 18 to the other. Each hole 22 in the illustrative embodiment is cylindrical and has a diameter 24. The cavity 20 is sized such that electromagnetic waves at a wavelength greater than twice the diameter 24 of each hole 22 can exist in the cavity 20 and the electromagnetic waves cannot propagate outward from the holes 22, thereby permitting the electromagnetic waves to persist in the cavity 20. As described in greater detail below, the holes 22 are drilled into opposite surfaces 30, 32 (illustratively top surface 30 and bottom surface 32) of the block 18 and are spaced apart such that the holes 22 defined in the surface 30 overlap with the holes 22 defined in the opposite surface 32, thereby forming the cavity 20.

Returning to FIG. 1, the quantum computer element 14 includes a superconducting qubit 40, which is configured to be inserted into any of the holes 22 of the resonator 16. In that way, each hole 22 acts as a port connecting the superconducting qubit 40 to the cavity 20. It should be appreciated that, as used herein, the term "superconducting qubit" refers to a physical structure that can support two or more quantum states. In the illustrative embodiment, the superconducting qubit 40 is a type of charge qubit called a transmission-line shunted plasma oscillation qubit, or transmon, as described in more detail below in regard to FIGS. 12 & 13. In other embodiments, the superconducting qubit 40 may be a different type of superconducting qubit, such as, for example, a charge qubit or a flux qubit. In some embodiments, the quantum computer element 14 may not include a superconducting qubit 40 but may include some other component such as an antenna, a transceiver for converting photons from one frequency to another, or some other component. The superconducting qubit 40 is part of a probe assembly 42 that includes a base 44. The base 44 is illustratively a metallic plate configured to support or mount the superconducting qubit 40 in place on the resonator 16. It should be appreciated that in other embodiments the base may be any suitable structure for holding or mounting the superconducting qubit 40 in place. In some embodiments, the base 44 may be incorporated into or otherwise form a part of the resonator 16, the superconducting qubit 40, or some other component.

One or more wires 50 extend from the probe assembly 42 to an inner control box 52. The inner control box 52 may send, receive, amplify, filter, attenuate and otherwise control various signals to and from the superconducting qubit 40. One or more wires 54 extend from the inner control box 52 to the outer control box 56. The outer control box 56 may send, receive, amplify, filter, attenuate and otherwise control various signals to and from the superconducting qubit 40 in a similar manner as the inner control box 52. The wires 50 and 54 may be any suitable wire capable of carrying signals to and from the superconducting qubit 40, such as copper coaxial wires or twisted-pair wires.

The refrigerator 12 is a dilution refrigerator capable of chilling a sample to a temperature of approximately 20 millikelvin (mK). In other embodiments, the refrigerator 12 may be any other suitable type of refrigerator, such as a magnetic refrigerator, and may be capable of cooling down a sample such as the resonator 16 to a different temperature, such as 77 Kelvin, 4 Kelvin, 1 Kelvin, or 100 mK. The illustrative inner control box 52 is inside the refrigerator 12, cooled down to a low temperature such as 1 Kelvin. It should be appreciated that, in some embodiments, the system 10 may include more than one inner control box 52 or various other electrical elements not shown, which may be at various temperatures such as 4 Kelvin, 1 Kelvin, 100 mK, or 20 mK. The illustrative outer control box 56 is outside the refrigerator 12 and is at room temperature. It should be appreciated that the system 10 may include additional electronics in some embodiments, such as logic electronics, wave-shaping electronics, etc.

As described above, the resonator 16 includes a monolithic block 18 and a cavity 20 that is defined in the block 18. As shown in FIG. 2, the block 18 in the illustrative embodiment is a rectangular prism that extends from a longitudinal end wall 60 to an opposite longitudinal end wall 62. A pair of planar sidewalls 64, 66 connect the end walls 60, 62 and the top surface 30 and the bottom surface 32. It should be appreciated that the labels "top," "bottom," etc. of the resonator 16 are merely used as a convenient way to describe the device, and do not restrict the orientation of the resonator 16. It should also be appreciated that in other embodiments the block may take other geometric forms.

Figure 3:
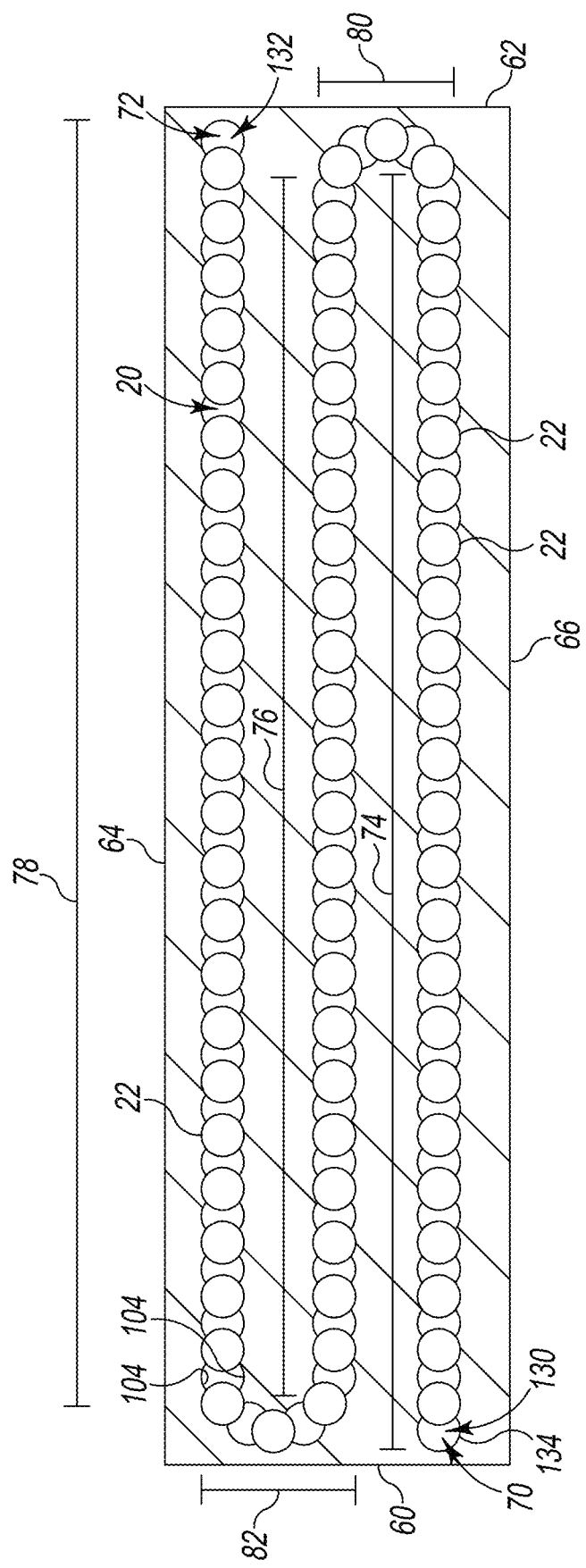
FIG. 3 is a cross-sectional plan view of the resonator of FIG. 2.

As shown in FIG. 3, the cavity 20 is positioned within the block 18, inset from the walls 60, 62, 64, 66 and the surfaces 30, 32. The cavity 20 extends from a closed end 70 at end transverse hole 132 positioned adjacent to the end wall 60 to another closed end 72 at end transverse hole 130 positioned adjacent to the opposite end wall 62. The cavity 20 in the illustrative embodiment includes three longitudinal sections 74, 76, 78 that are connected by end sections 80, 82. The sections 74, 76, 78, 80, 82 cooperate to define the length of the cavity 20 between its ends 70, 72. Each of the sections 74, 76, 78 extend parallel to one another and are formed by parallel rows of transverse holes 22.

Figure 4:
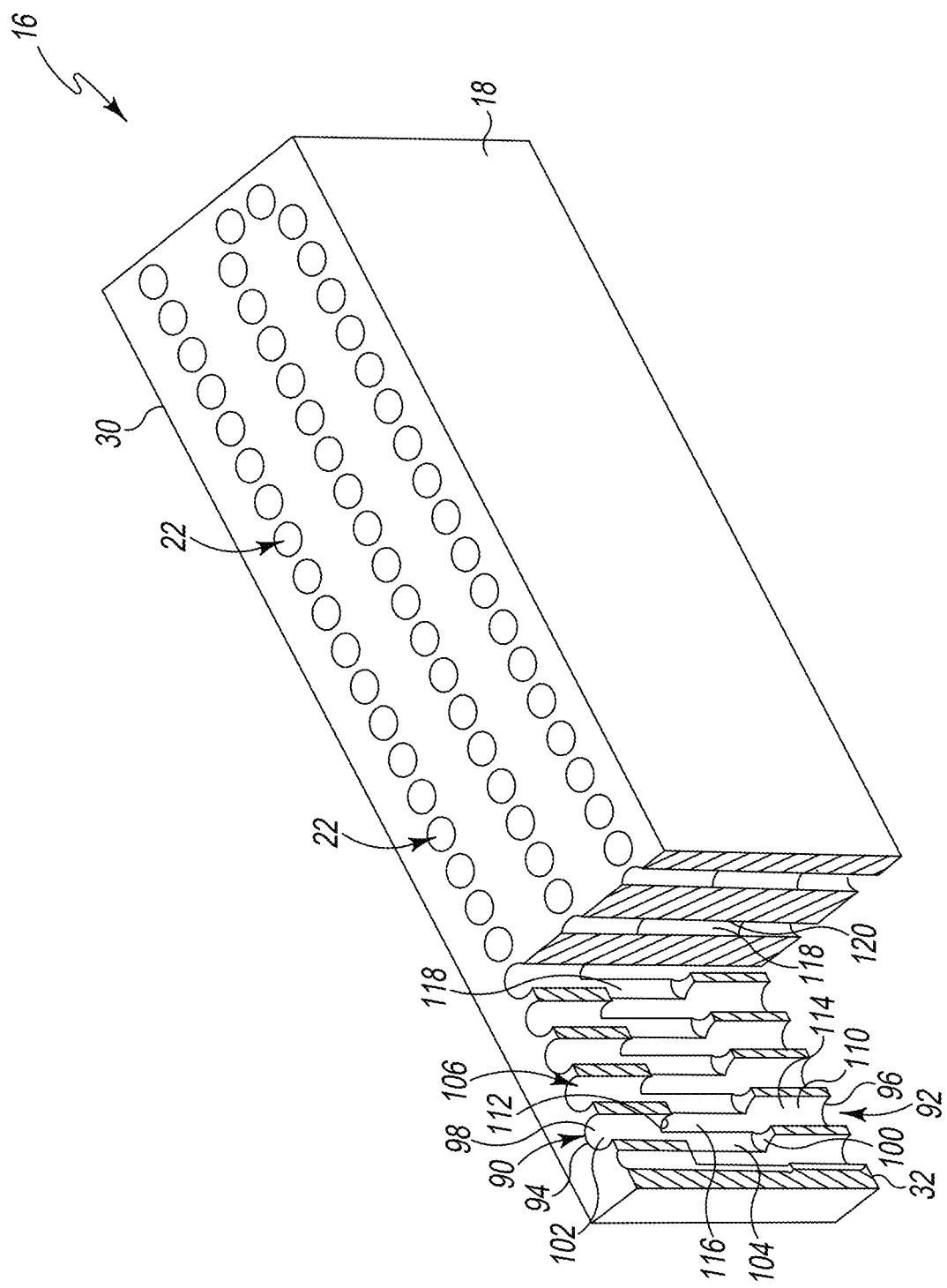
FIG. 4 is a cross-sectional perspective view of the resonator of FIG. 2.

In the illustrative embodiment, the configuration of each traverse hole 22 is identical such that the features used to describe the configuration of one pair of transverse holes provide a description of the configurations of the other transverse holes. Referring now to FIG. 4, the number of transverse holes 22 include a transverse hole 90, which extends inwardly from the top surface 30, and a transverse hole 92, which overlaps with the transverse hole 90 and extends inwardly from the bottom surface 32. The transverse hole 90 includes an opening 94 that is defined in the top surface 30, and the transverse hole 92 includes a similar opening 96 that is defined in the bottom surface 32.

The transverse hole 90 is defined by a sidewall 98 that extends inwardly from the opening 94 of the hole 90 to a base inner surface 100. The sidewall 98 includes an outer cylindrical surface 102 that extends from the opening 94 and defines the transverse hole 90. The sidewall 98 also includes a pair of curved inner surfaces 104 (see FIG. 3) that extends from the outer cylindrical surface 102 to the base inner surface 100. The outer cylindrical surface 102 defines an outer end of the hole 90, and the curved inner surfaces define an inner end of the hole 90.

The transverse hole 92 is defined by another sidewall 110 extends inwardly from the opening 96 of the hole 92 to a base inner surface 112. It should be appreciated that the base inner surfaces 100, 112 may be concave and conical, matching a portion of the shape of the drill bit or reamer used to create the hole. The sidewall 110 includes an outer cylindrical surface 114 that extends from the opening 96 and defines the transverse hole 92. The sidewall 110 also includes a pair of curved inner surfaces 116 (see FIG. 3) that extends from the outer cylindrical surface 114 to the base inner surface 112. The outer cylindrical surface 114 defines an outer end of the hole 92, and the curved inner surfaces 116 define an inner end of the hole 92. The overlapping inner ends of the holes 90, 92, along with the overlapping inner ends of the other number of transverse holes, define the cavity 20.

Figure 6:
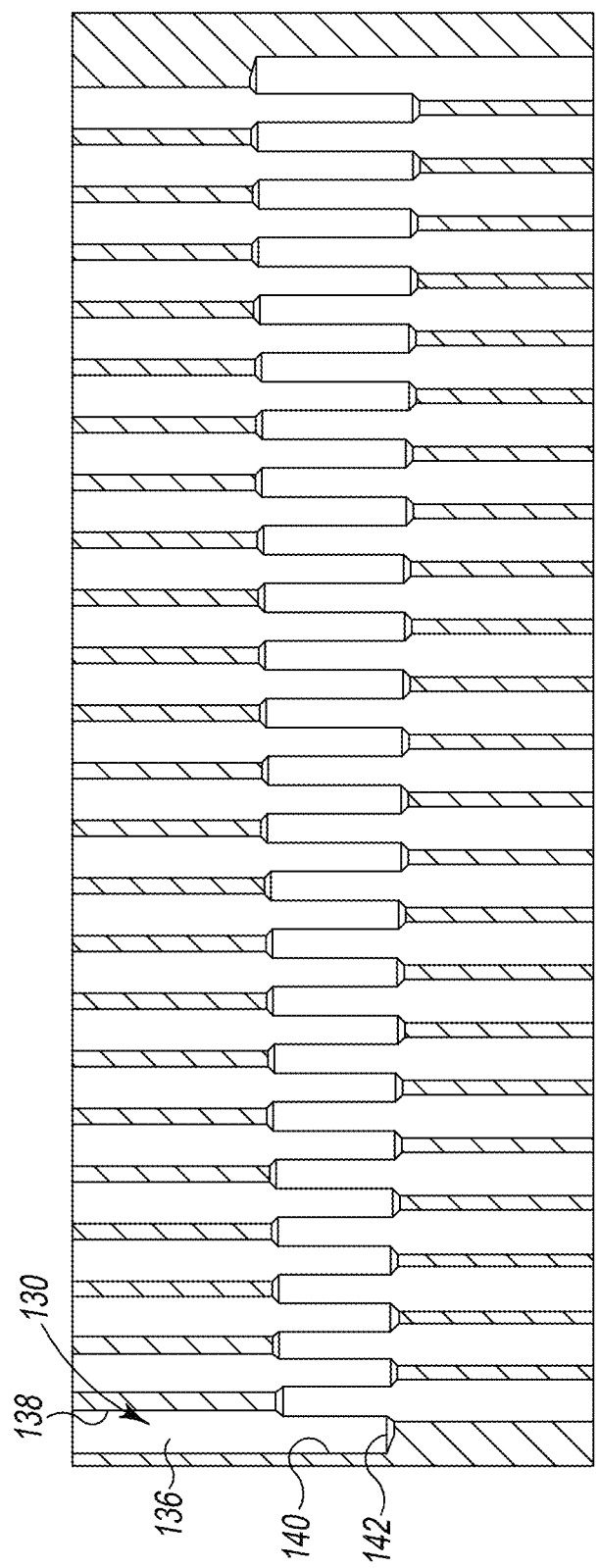
FIG. 6 is a cross-sectional elevation view of the resonator of FIG. 2.

End transverse holes 130, 132 only overlap with one other hole, leading to a different configuration of the corresponding sidewalls. As shown in FIG. 6, the sidewall 136 that defines hole 130 includes an outer cylindrical surface 138 that extends from the opening 134 and defines the end transverse hole 130. The sidewall 136 also includes a curved inner surface 140 that extends from the outer cylindrical surface 138 to the base inner surface 142.

In the illustrative embodiment, the inner surfaces 104, 116 of the sidewalls 98, 110 defining the holes 22 cooperate to define the seamless sidewalls 118, 120 of the cavity 20. The base inner surfaces 100, 112 connected to the sidewalls 98, 110 cooperate to define the top and bottom walls 124 (see FIG. 5), respectively, of the cavity 20.

Figure 5:
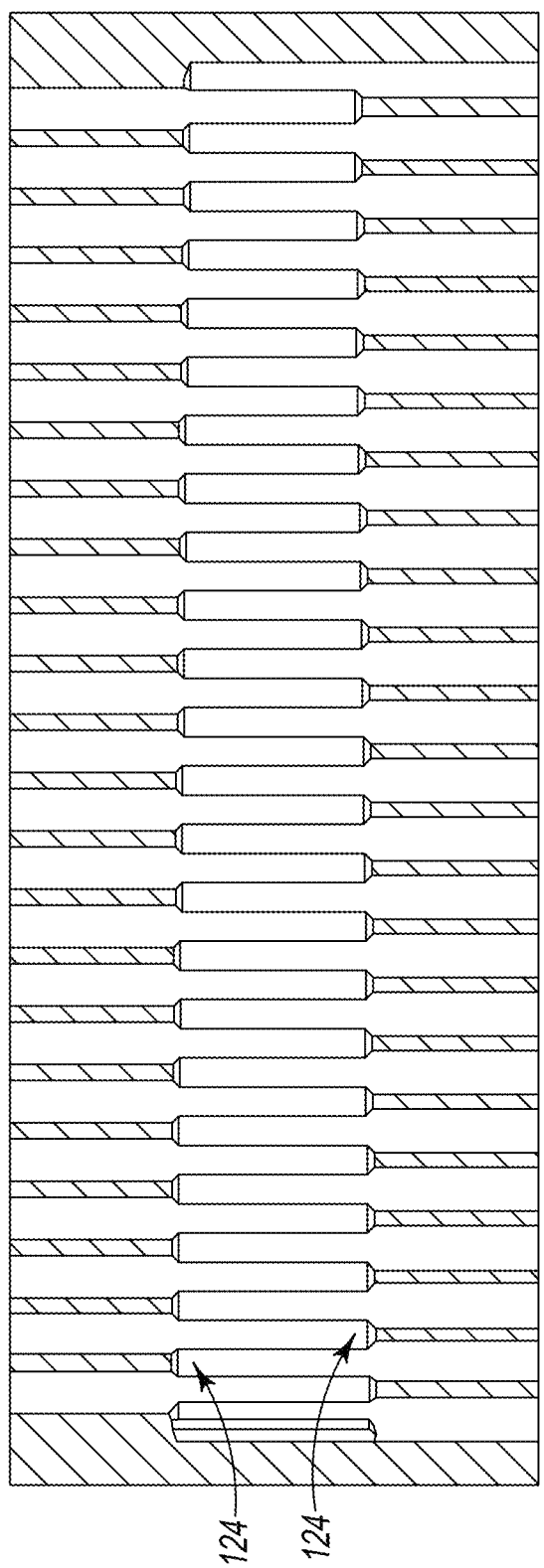
FIG. 5 is a cross-sectional elevation view of the resonator of FIG. 2.

In the illustrative embodiment, the transverse holes 90, 92 each have the same diameter and are approximately equally spaced apart. For example, the diameter of the hole 90 may be 7 millimeters (mm) and the spacing between transverse hole 90 and adjacent transverse hole 106 may be 1.5 mm. In other embodiments, the holes may be different diameter and spacing, such as 100 micrometer to 100 millimeter diameter holes and/or 20 micrometer to 20 millimeter spacing between holes. In the regions where series of holes curve and are not collinear, the spacing of the transverse holes may vary in order to maintain the desired cavity 20 structure inside the resonator 16. The height of the cavity 20 at the location of the holes 90, 92 is defined by the distance between the top and bottom walls 124. In some embodiments, the height of the cavity 20 may be approximately constant. In other embodiments, the height of the cavity 20 may vary, such as by varying the depth of the number of holes of the cavity 20. For example, in the illustrative embodiment and as can be seen in FIGS. 5 & 6, the distance between base inner surfaces may vary such that the height of the cavity 20 decrease at a rate proportional to the distance from the start of the cavity 20 defined at transverse hole 72. Such a taper may lead to an equal spacing of the frequencies of the cavity 20, as discussed in more detail below. In other embodiments, the number of transverse holes in the resonator 16 may have different diameters and spacing in a manner that still create the desired cavity 20 in the resonator 16.

The illustrative resonator 16 is made from aluminum that is over 99.999% pure. In other embodiments, a different purity may be used such as >99%, >99.9%, >99.99%, or >99.9999%. In some embodiments, different materials may be used, such as niobium, copper, titanium nitride, niobium-titanium alloy, niobium titanium nitride, indium, lead, tin, lead-tin alloy, rhenium, etc. Additionally or alternatively, a coating, electroplating, or other deposition may be applied as a thin or thick film to a material. The film may be any suitable material, such as titanium nitride, niobium titanium nitride, indium, lead, lead-tin allow, rhenium or rhenium, gold, and copper multilayers. The material which is plated may be any suitable material, such as oxygen-free high thermal conductivity (OFHC) copper. In the illustrative embodiment, in use, the resonator 16 is cooled to cryogenic temperatures, such as 20 mK, and the resonator 16 is formed from a material that is superconducting at such temperatures. In other embodiments, the resonator 16 may operate at different temperatures, such as 100 mK, 1 K, 4 K, 77 K, or room temperature, and/or may be made of a material that is not superconducting. Of course, the properties of the material such as whether it is superconducting may affect the performance of the resonator 16, such as the lifetime of the electromagnetic modes supported by the resonator 16. The illustrative resonator 16 is formed by drilling or milling each of the transverse holes straight into the resonator 16. The tool used may be any suitable cutter or drill bit and may be chosen based on the properties of the transverse holes created. For example, an end mill cutter that creates a flat surface at the end of the cutter may be used in some embodiments. In the illustrative embodiment, an end mill cutter is used that creates a round hole, as shown in transverse holes 90, 92. Additionally or alternatively, in other embodiments, an end mill cutter or drill bit that creates holes of other shapes may be used, such as square holes. In some embodiments, other machining or manufacturing techniques may be used, such as electrical discharge machining (EDM), sinker EDM, wire EDM, etc. After the holes are drilled into the illustrative resonator 16, the resonator 16 is etched to remove the outer layer, which may have been damaged during the drilling process. In the illustrative embodiment, the resonator 16 is submerged in an aluminum etchant at 50° C. with a spinner for two hours, then submerged in fresh aluminum etchant 50° C. for two more hours. The resonator 16 is then thoroughly rinsed with water. Of course, the resonator 16 may be formed in other embodiments by any suitable process. For example, in the illustrative embodiment, the resonator 16 may be manufactured using 3D printing or other additive manufacturing processes.

For purposes of rough calculations, the illustrative cavity 20 can be approximated as a box with a height corresponding to the distance between the base inner surfaces 100, 112, a width corresponding to the distance between the inner curved walls 104 (which will be equal to the diameter of the hole 90), and a length corresponding to the distance between the ends 70 and 72 when traversing the cavity 20. It should be appreciated that the height, width, and length of the cavity 20 are merely convenient labels, and do not imply that the cavity 20 has a uniform width and length or is in the shape of a box. In particular, the length is an effective length of the cavity 20, and may be larger than any exterior dimension of the resonator 16. The cavity 20 supports one or more electromagnetic waves. It should be appreciated that the cavity 20 supports electromagnetic modes despite the bends in the cavity 20. The supported mode frequencies of an ideal box cavity with perfectly conducting walls and with length a, height b, and width d have frequencies $$\omega_{mnl} = \pi c \sqrt{\left(\frac{n}{a}\right)^2 + \left(\frac{m}{b}\right)^2 + \left(\frac{l}{d}\right)^2},$$

where at least two of mode indices n, m, and l must be non-zero. Approximating the cavity 20 as a box with a length of 1 meter, a height of 22 mm, and a width of 7 mm, the cavity 20 would support a mode with a frequency of about 7 GHz for n=1, m=1, and l=0. The transverse holes, such as transverse hole 90, can be considered as a waveguide that could potentially support the waves contained in the cavity 20. If the waves in the cavity 20 can propagate through, e.g., transverse hole 90, then the quality factor or ring-down time of the cavity 20 would be limited. The cutoff frequency for a waveguide is approximately the frequency corresponding to a wavelength that is half of the diameter of the holes. With a 7 mm diameter for the transverse hole 90, the cutoff frequency would be approximately 21 GHz. It should be appreciated that the cavity 20 may support multiple modes that are below the cutoff frequency of the transverse, such as several modes with n≥1, m=1, l=0. Of course, in some embodiments, the cavity 20 may also support modes with, e.g., m=2, 3, etc. Which modes are supported depend on the effective length of the cavity and the height of the cavity.

As can be seen from FIGS. 5 & 6, in the illustrative embodiment, the cavity 20 that has a non-uniform height. The shape of the cavity 20 affects the spectrum of the supported modes. In particular, if we consider the equation for the frequencies of the modes in the cavity, $$\omega_{mnl} = \pi c \sqrt{\left(\frac{n}{a}\right)^2 + \left(\frac{m}{b}\right)^2 + \left(\frac{l}{d}\right)^2},$$

we can simplify the equation if we assume that a>>b and b>d. Assuming that l=0 and m=1, the equation simplifies to $$\omega_n \approx \frac{\pi c}{b} + \frac{\pi c b}{2a^2} n^2.$$

Based on this equation, we can see that the frequency of the mode for any given n is proportional to $$\frac{n^2}{a^2}$$

plus a fixed amount. This fact can be used to manipulate the spacing of the modes. For example, if we can manipulate the effective length of the cavity to be proportional to $\sqrt{n}$, then the modes will be equally spaced. One way to do that would be to taper the cavity 20 by changing the height of the cavity 20 along the length of the cavity 20. Since longer wavelengths with lower frequencies will be excluded from portions of the cavity 20 that are tapered to the point where the longer-wavelength modes are not supported, the effective length of the cavity depends on the frequency. By reducing the height an amount that is proportional to the square of the distance from the end of the cavity, the desired spacing can be achieved, as shown in FIG. 7E. Another option for tapering would be to have the height be a maximum at the middle of the cavity 20 and taper both ends of the cavity 20 to be a smaller height.

It should also be appreciated that the modes of the cavity 20 will have non-zero field amplitude in the transverse holes, but if the frequency of the modes of the cavity 20 is below the cutoff frequency of the holes, the amplitude will decay exponentially in the holes. The length of the necks outer sidewalls, such as outer sidewall 102, determines how much the amplitude decays before reaching the top surface 30 and the bottom surface 32. In the illustrative embodiment, the lengths of the outer sidewalls such as outer sidewall 102 are chosen such that the field amplitude is small enough at the top surface 30 and bottom surface 32 that the lifetime of the modes in the cavity 20 is not significantly limited by the intensity leaking out through the transverse holes.

Figure 7A:
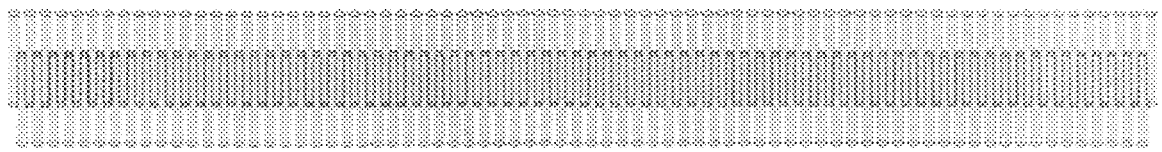
FIGS. 7A-7F illustrate simplified models of two embodiments of cavities formed inside the resonator of FIG. 1, including field strengths of modes of the cavity.
Figure 7B:
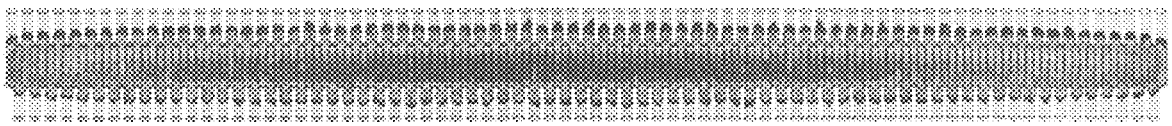
Figure 7C:
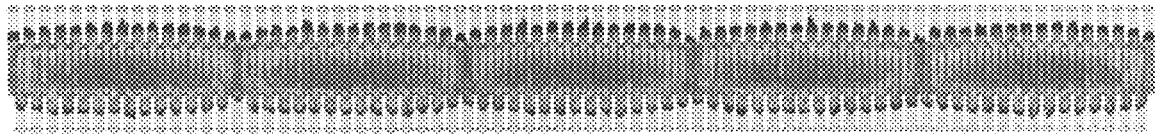
Figure 7D:
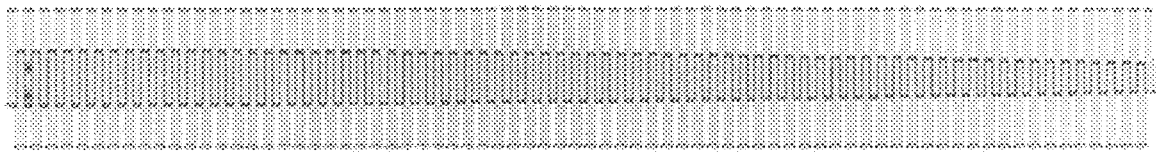
Figure 7E:
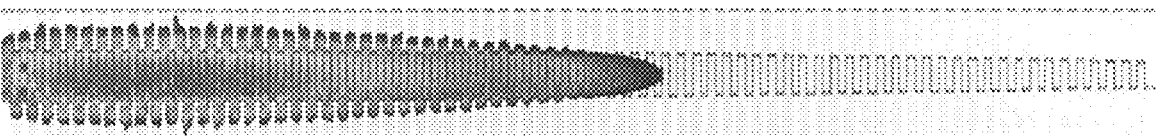

Referring now to FIGS. 7A-7E, FIG. 7A shows a model of a cavity based on overlapping holes that does not have a tapered height. The logarithm of the mode intensity is shown in FIG. 7B for the fundamental mode, n=1, m=1, l=0 calculated using a finite-element simulation. The logarithm of the mode intensity for a higher-frequency mode, n=5, m=1, l=0 is shown in FIG. 7C. Note that the intensity near the outer edges of the holes is negligible.

Figure 7F:
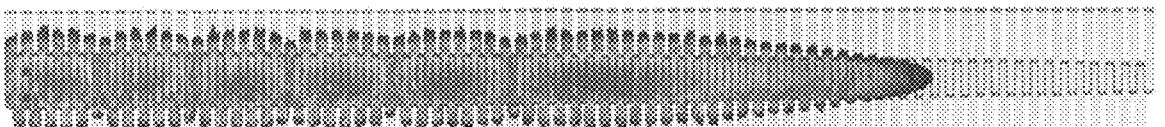

FIG. 7D shows a model of a cavity based on overlapping holes that has a tapered height. FIG. 7D corresponds to the snake-like cavity 20 if it were "unfolded" to be straight with an equivalent length. The logarithm of the mode intensity is shown in FIG. 7E for the fundamental mode, n=1, m=1, l=0 calculated using a finite-element simulation. The logarithm of the mode intensity for a higher-frequency mode, n=6, m=1, l=0 is shown in FIG. 7F. Note that the high-frequency mode extends further into the tapered region, indicating that the effective length is longer for the higher-frequency mode.

Figure 8A:
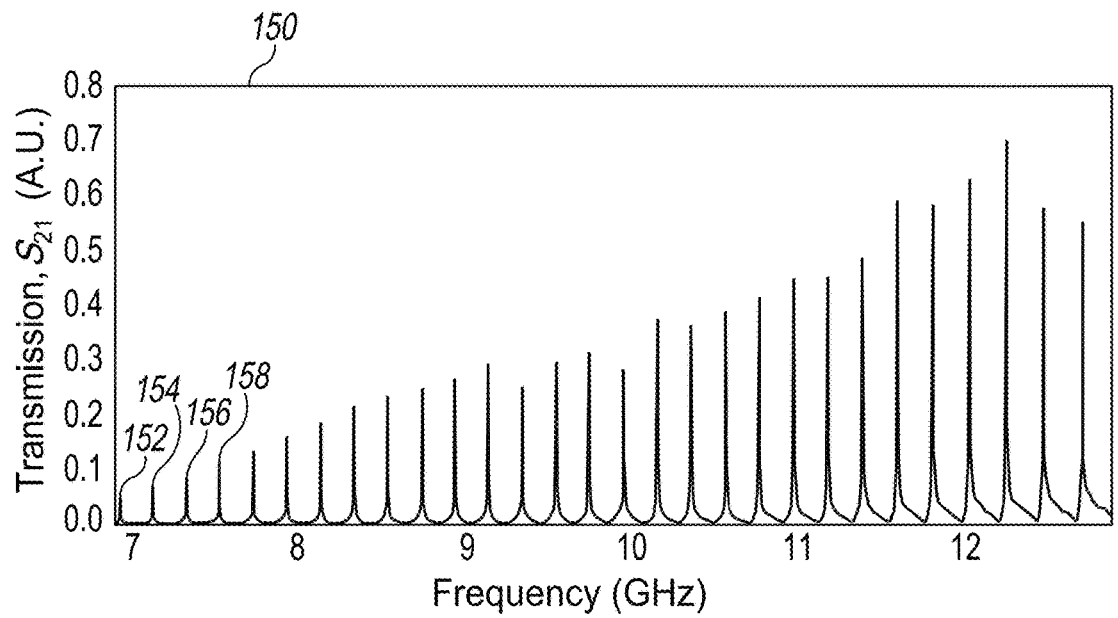
FIGS. 8A & 8B are charts showing frequencies of modes of the cavity and quality factors and ring-down times of the modes of the cavity.
Figure 8B:
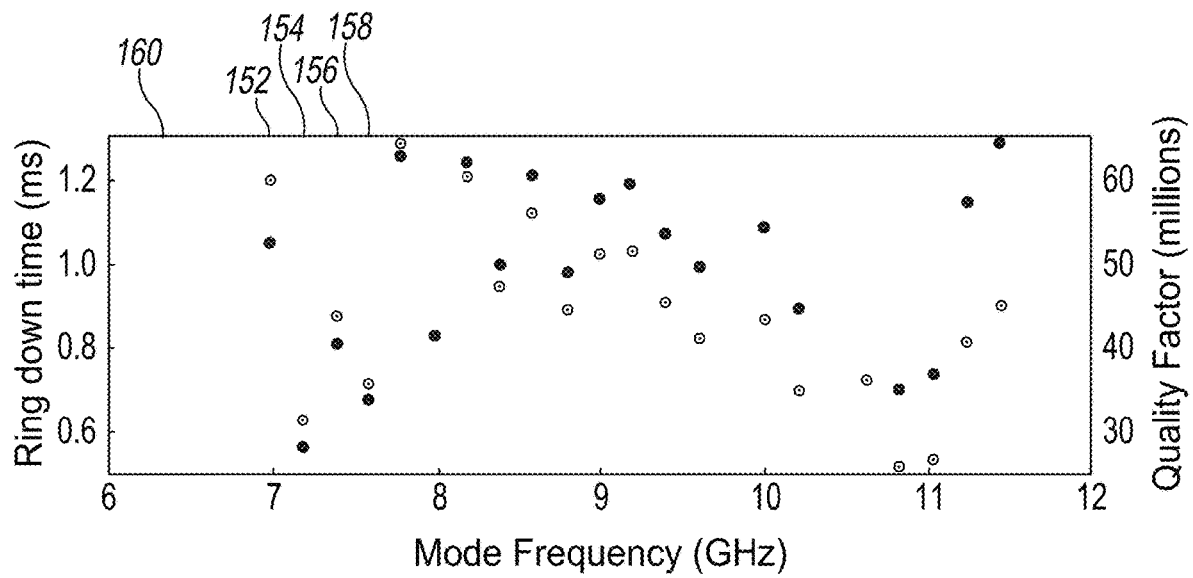

Referring now to FIGS. 8A & 8B, the mode frequencies supported by the cavity 20 are shown in a graph 150. As discussed below in more detail in regard to FIGS. 14-16, the height of the cavity 20 is tapered, varying the effective length of the cavity based on the mode frequency. The tapering causes the frequencies of the modes supported in the cavity 20 to be approximately equal, as can be seen in FIG. 8A. For example, modes 152, 154, 156, and 158, which correspond to the lowest-frequency 4 modes, are spaced by approximately 200 MHz. The modes in FIG. 8A were measured by weakly coupling an input cable and an output cable to the cavity 20. Since the amplitudes of the peaks depend on the coupling strength of the input and output cables, the height of the peaks does not indicate any performance parameters of the cavity 20 itself.

FIG. 8B shows a plot 160 of the measured quality factor (Q-factor) and ring down time for some of the modes supported by the cavity 20. The Q-factor of a mode is defined as the ratio of the energy stored in the mode to the energy dissipated per cycle of the mode. The measured Q-factors were measured to be over 25 million for each mode and the ring-down time was measured to be over 0.5 milliseconds for each mode. Due to measurement errors, the measured Q-factors may not necessarily exactly correspond to the measured ring-down time.

Figure 9:
FIG. 9 is a top plan view of a probe inserted into the resonator of the superconducting quantum computing device of FIG. 1.
Figure 10:
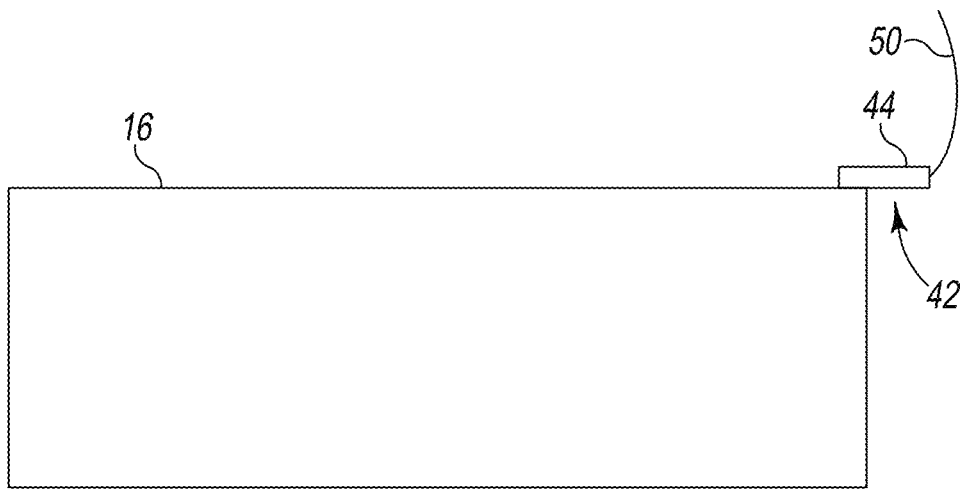
FIG. 10 is a side elevation view of the probe and the resonator of FIG. 9.
Figure 11:
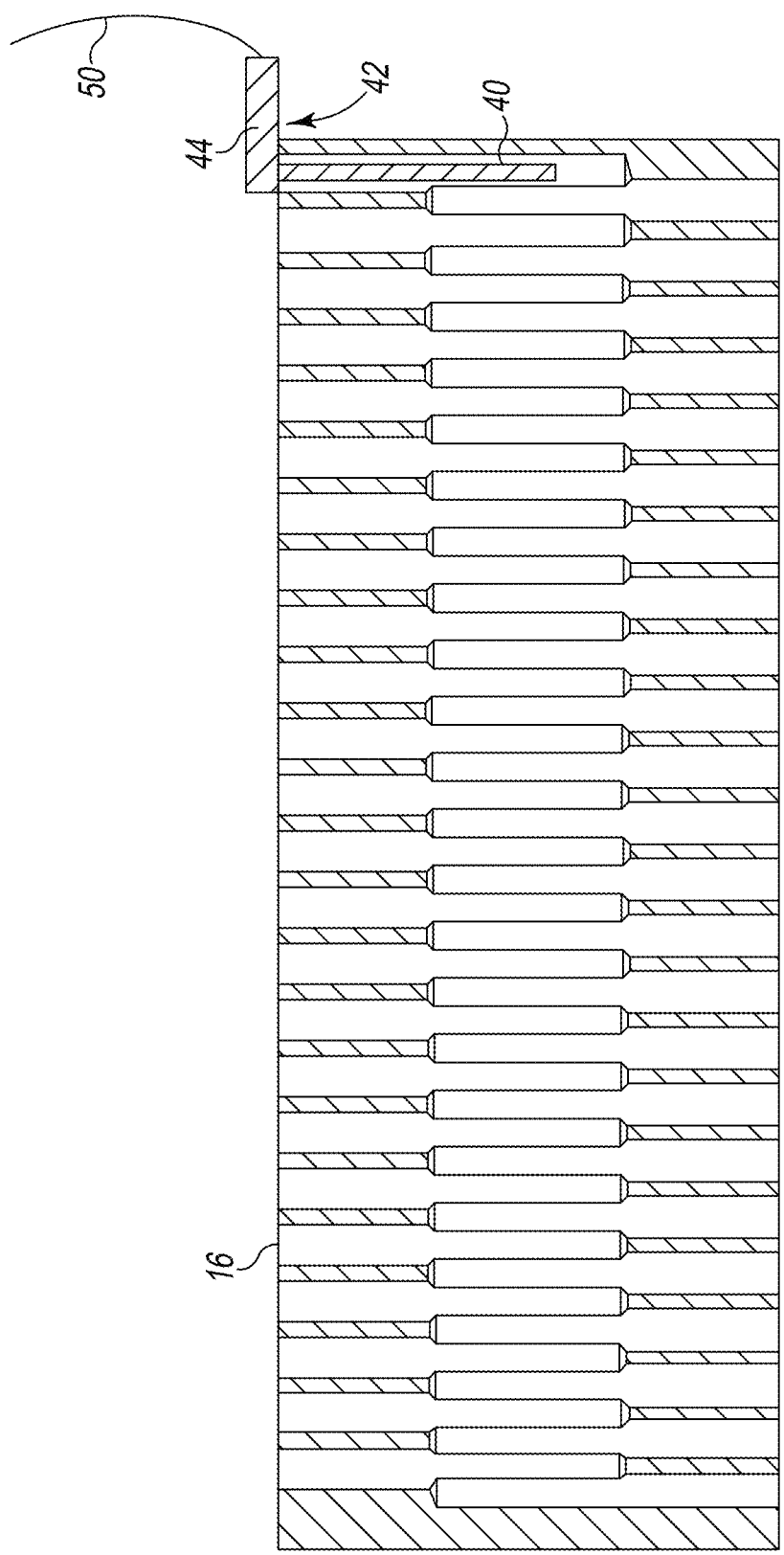
FIG. 11 is a cross-sectional side elevation view of the quantum computer element of FIG. 9.

Referring now to FIG. 9, a top plan view of the quantum computer element 14 includes the probe assembly 42 which supports a superconducting qubit 40 inserted into a port of the cavity 20 through one of the transverse holes. As discussed in more detail below in regard to FIGS. 12 & 13, the superconducting qubit 40 can interact with the modes of the cavity 20. FIG. 10 shows a side elevation view of the quantum computer element 14. FIG. 11 shows a cross-sectional side elevation view of the quantum element 14 with the superconducting qubit 40 inserted into the cavity 20. In the illustrative embodiment, one superconducting qubit 40 is inserted in the cavity 20. In some embodiments, two or more superconducting qubits 40 may be inserted in the cavity 20.

Figure 12A:
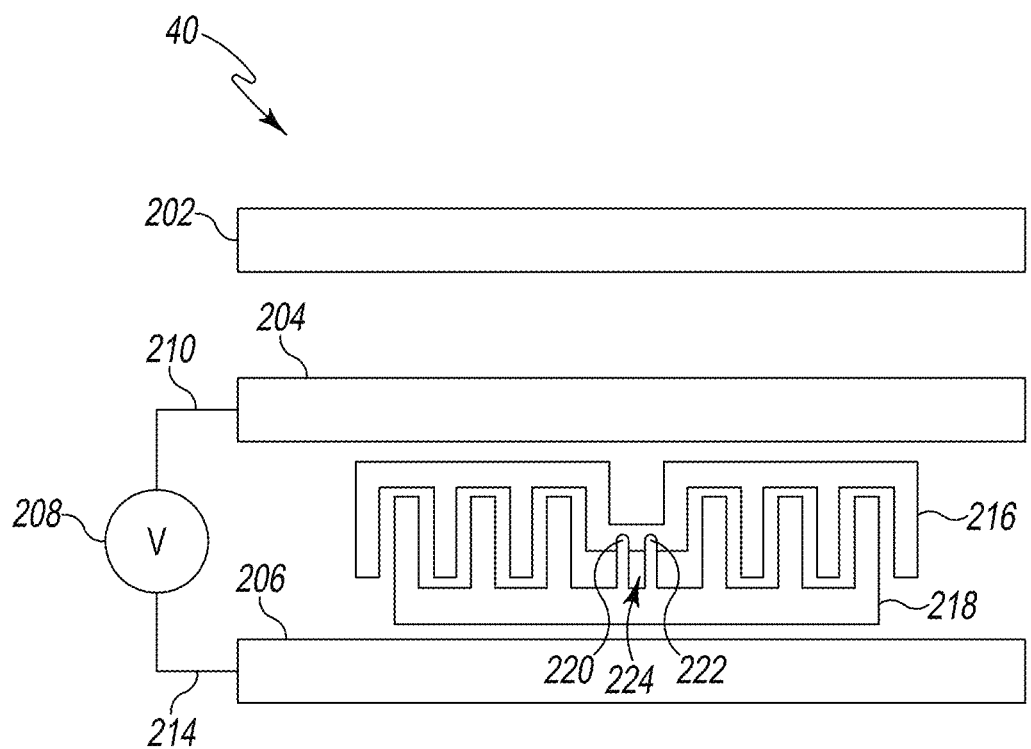
FIGS. 12A & 12B are a simplified block diagram of a superconducting qubit and an equivalent circuit diagram.
Figure 12B:
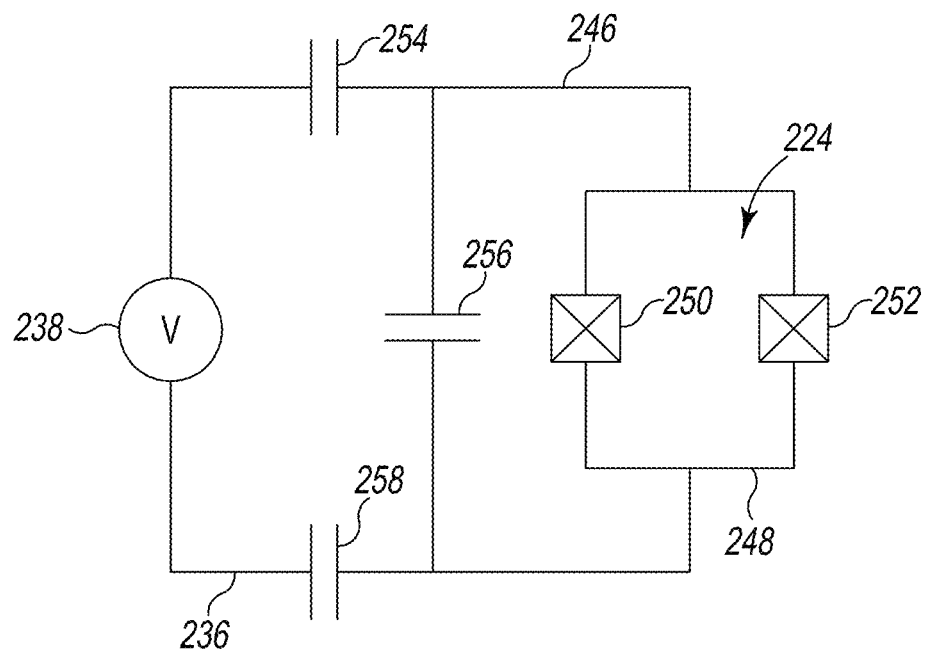

Referring now to FIGS. 12A & 12B, FIG. 12A shows a simplified block diagram of an illustrative embodiment of a superconducting qubit 40. The illustrative superconducting transmon qubit 40 is formed by a first ground plane 202, a second ground plane 206, and a strip 204. In some embodiments, the first ground plane 202, the second ground plane 206, and the strip 204 may form a transmission line cavity. In other embodiments, no transmission line may be present, in which case the ground plane 202 may not be necessary. Between the ground plane 206 and the strip 204, two superconducting islands 216, 218 are arranged to have a particular desired capacitance controlled by the geometry of the islands. Two Josephson junctions 220, 222 are formed by a slight gap between the two superconducting islands 220, 222 that is filled with an insulator such as aluminum oxide.

The superconducting qubit 40 can be in different quantum states based on the difference between the number of electrons in the superconducting islands 216, 218. The spacing between the energy levels is not uniform. The state of the superconducting qubit 40 can be controlled by controlling the voltage levels across the ground plane 206 and the control strip 204, such as by applying a voltage 208 across wires 210 and 214 connected to the strip 204 and the ground plane 206, respectively. A magnetic flux can be applied in the loop 224 formed by the superconducting islands 216, 218 and the Josephson junctions 220, 222. The amount of magnetic flux applied can change the Josephson energy and, therefore, change the energy levels of the superconducting qubit 40. The magnetic flux can be applied by, e.g., an inductor that is not shown.

The superconducting qubit 40 couples to electromagnetic waves that are at a frequency corresponding to the difference between the current energy level of the superconducting qubit 40 and a different energy level of the superconducting qubit 40. The electromagnetic waves to which the superconducting qubit 40 couples could be, e.g., a mode in a transmission line cavity formed by the ground planes 202, 206 and the strip 204 or a mode in the cavity 20. For example, if the superconducting qubit 40 is in the ground state, and the next highest energy level is 7 GHz, the superconducting qubit 40 will couple to a mode of the cavity 20 that is at 7 GHz. If a 7 GHz photon is in the cavity 20, it will be absorbed by the superconducting qubit 40, exciting it to a higher energy level. Since the energy levels of the superconducting qubit 40 can be controlled by changing the amount of flux in the loop 224, the coupling between the modes of the cavity 20 and the superconducting qubit 40 can be controlled. What the state of the superconducting qubit 40 is (such as whether the superconducting qubit 40 is in the ground state or a first excited state) can be determined by measuring whether the superconducting qubit 40 couples to the first excited state and the second excited state, which are spaced by an energy different from the ground state and the first excited state. This measurement can be done by, e.g., sending a weak signal at or near the frequency corresponding to the difference between the energy of the first and second excited energy levels through a cavity (such as a transmission line or the cavity 20) and measuring how the signal was shifted. Since the signal will be shifted depending on the state of the superconducting qubit 40, the state of the superconducting qubit 40 can be determined. It should be appreciated that the various parameters of the superconducting qubit 40, such as the voltage 208 applied across the superconducting qubit 40 and the flux in the loop 224 may be controlled by one or more external signals that may be carried by the wires 110. For example, in the illustrative embodiment, the wires 110 may include three cables for carrying three signals: a first connected to a charge port of the superconducting qubit 40 that applies qubit write and readout signals, a second connected to a flux port of the superconducting qubit 40 for shifting the qubit frequency using a DC-flux bias current, and a third connected to an output port for measuring the transmission from the readout signal.

It should be appreciated that the ability to control the superconducting qubit 40 discussed above allows for operation of single-qubit and two-qubit operations on the superconducting qubit 40 and the modes of the cavity 20. The state of the modes in the cavity 20 may be swapped with the state of the superconducting qubit 40 by virtue of vacuum Rabi oscillations when the energy levels of the superconducting qubit 40 are brought into resonance with a particular mode of the cavity 20. The state of the superconducting qubit 40 may be manipulated by controlling the applied voltage 208 across the superconducting qubit 40 and by controlling the magnetic flux through the loop 224. Single-qubit operations can be performed on the modes of the cavity 20 by swapping the state of a mode of the cavity 20 with the state of the superconducting qubit 40, performing single-qubit operations on the state of the superconducting qubit 40, and then swapping the state of the superconducting qubit 40 back into the mode of the cavity 20. Two-qubit operations can be performed between the state of the superconducting qubit 40 and a mode of the cavity by tuning the superconducting qubit 40 so that the energy between the first excitation level and the second excitation level is the same as the energy of a mode of the cavity for a long enough time to swap the states twice. Such a swap will impart a $\pi$ phase shift on the system only if the state of both the superconducting qubit 40 and the mode of the cavity are both "1" (i.e., the superconducting qubit 40 is in the first excited state and the cavity has a photon in it at that frequency). Such an operation is a controlled-phase gate. Two-qubit operations can be performed between two modes of the cavity 20 by first swapping the state of one of the modes of the cavity 20 with the superconducting qubit 506. The ability to use the superconducting qubit 506 to swap quantum states in various modes of the cavity in addition to the ability to perform two-qubit operations allows the system to perform universal quantum computation. It should be appreciated that, in some embodiments, different elements may be coupled to modes of the cavity 20 in addition to or as an alternative to the superconducting qubit 506. Those coupling elements may be linear or non-linear elements that can store and retrieve photons from the cavity, such as a tunable resonator or an antenna.

FIG. 12B shows a simplified circuit diagram that is approximately the equivalent of the superconducting qubit 40 block diagram shown in FIG. 12A. One side of both Josephson junctions 250, 252 is connected to a wire 246 and the other side of the Josephson junctions 250, 252 is connected to a wire 248. The Josephson junctions 250, 252 and wires 246, 248 form a loop 224 through which a certain magnetic flux can be applied. There is a capacitance 256 between the two sides of the Josephson junctions 250, 252. There is also a capacitance 254 between one side of the Josephson junctions 250, 252 and a wire 234 that is connected to one side of a voltage source 238. Finally, there is a capacitance 258 between the other side of the Josephson junctions 250, 252 and a wire 236 that is connected to the other side of the voltage source 238.

Figure 13A:
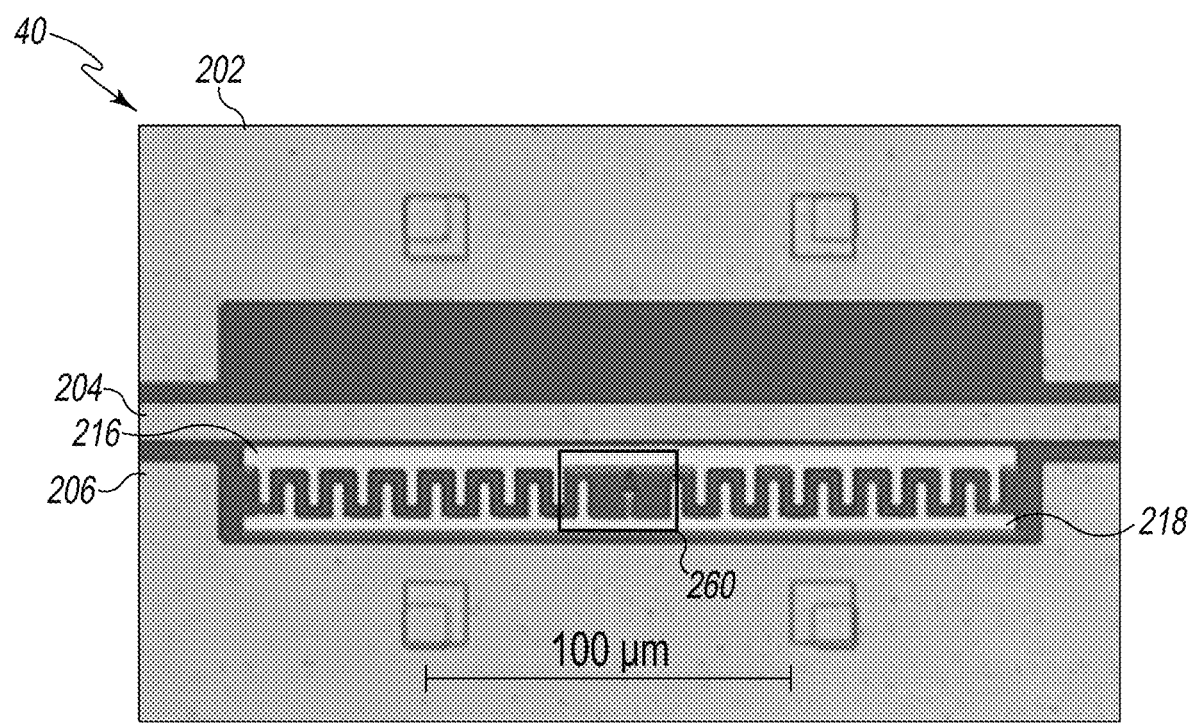
FIGS. 13A & 13B show pictures of one embodiment of a superconducting qubit.
Figure 13B:
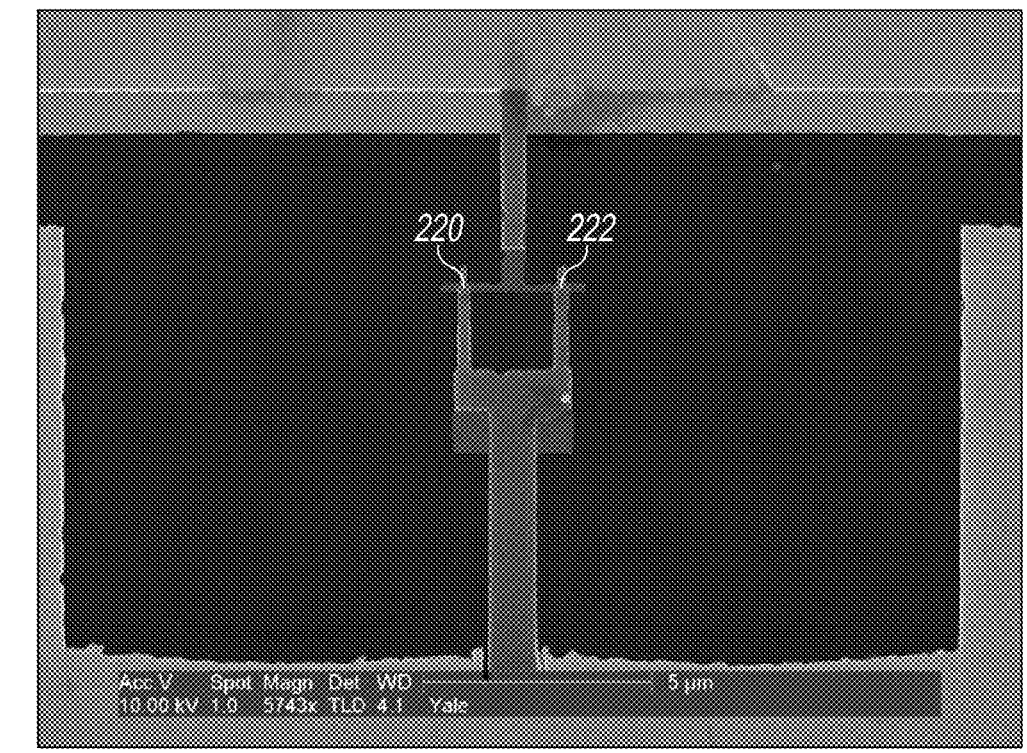

Referring now to FIG. 13A, an image of the superconducting qubit 40 shows conducting plane 202, conducting strip 204, ground plane 206, and superconducting islands 216 and 218. Region 260 includes the Josephson junctions 220, 222, as shown in FIG. 13B.

Figure 14:
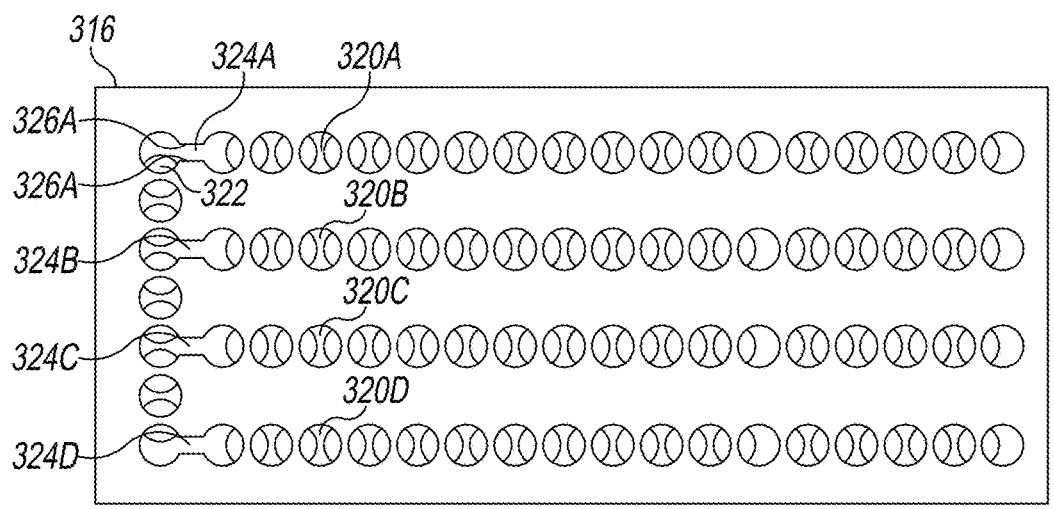
FIG. 14 is a top plan view of at least one embodiment of the resonator of FIG. 1, which includes several cavities formed from a monolithic block with slots for inserting superconducting qubits.
Figure 15:
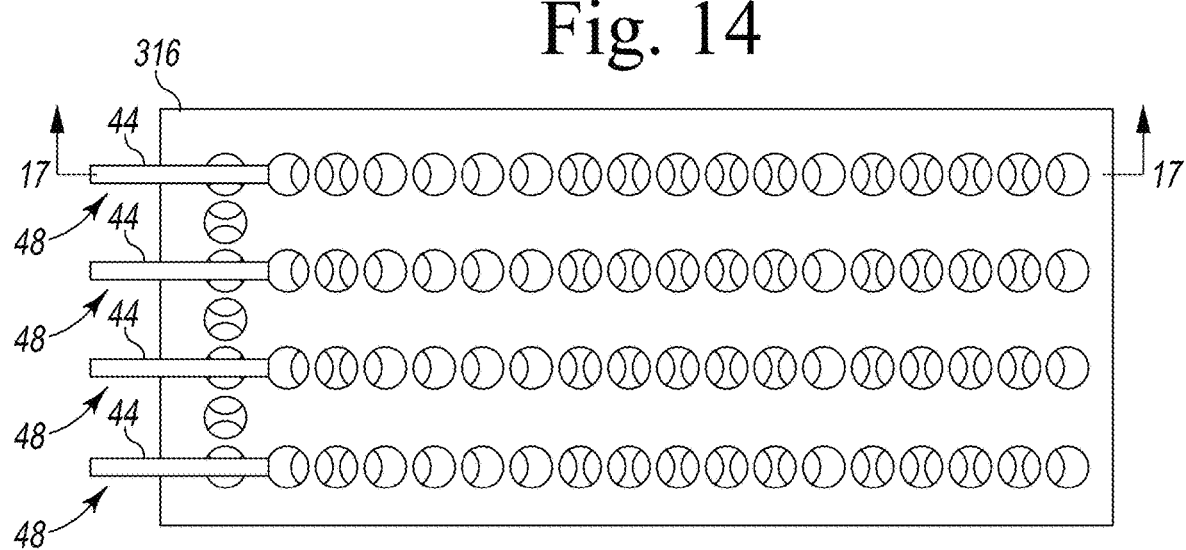
FIG. 15 is a top plan view of the resonator of FIG. 14 with a probe including a superconducting qubit inserted between cavities.
Figure 16:
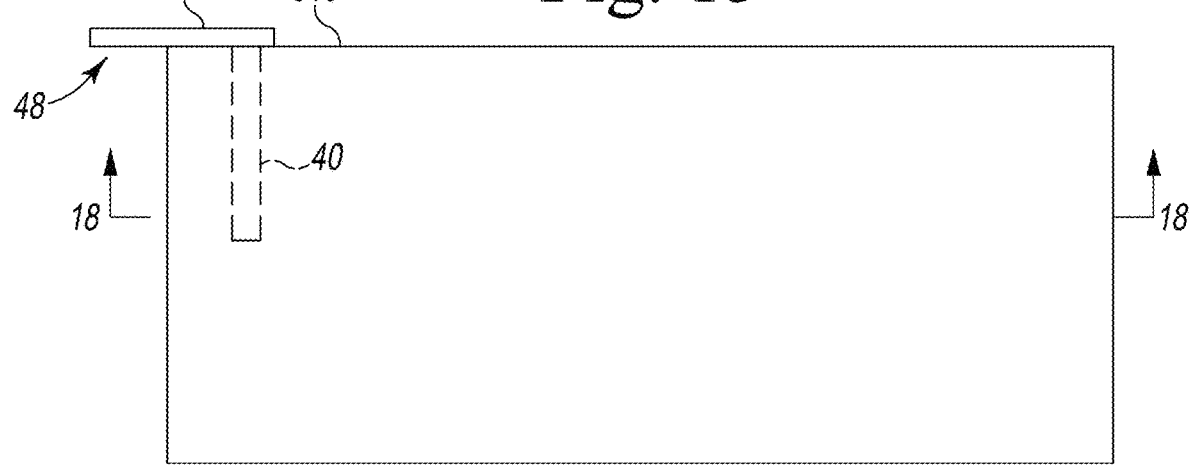
FIG. 16 is a side elevation view of the resonator of FIG. 15.
Figure 17:
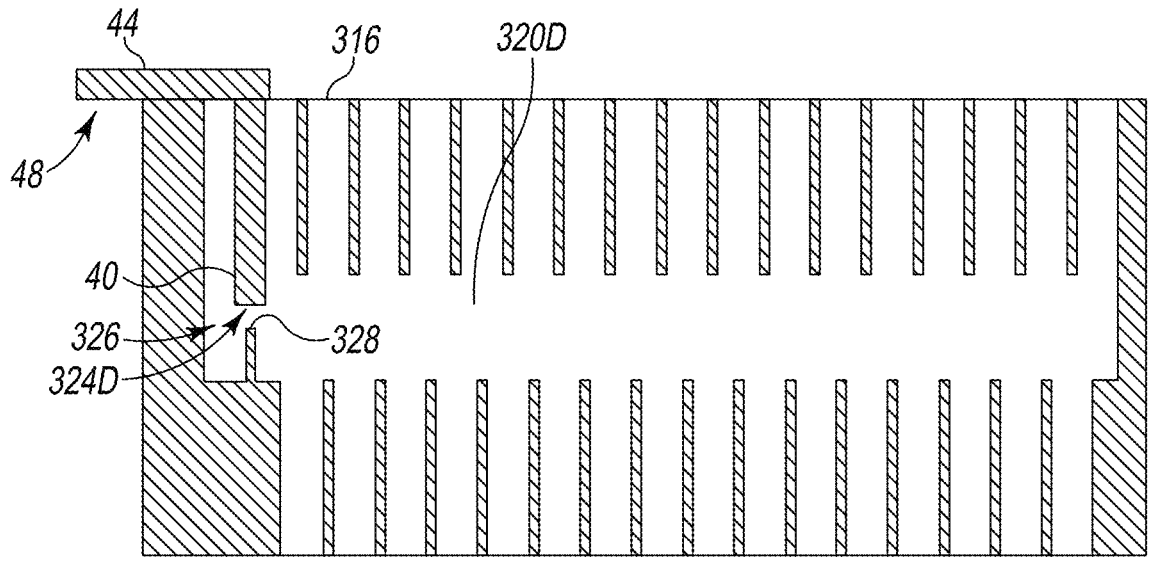
FIG. 17 is a cross-sectional side elevation view of the resonator of FIG. 15.
Figure 18:
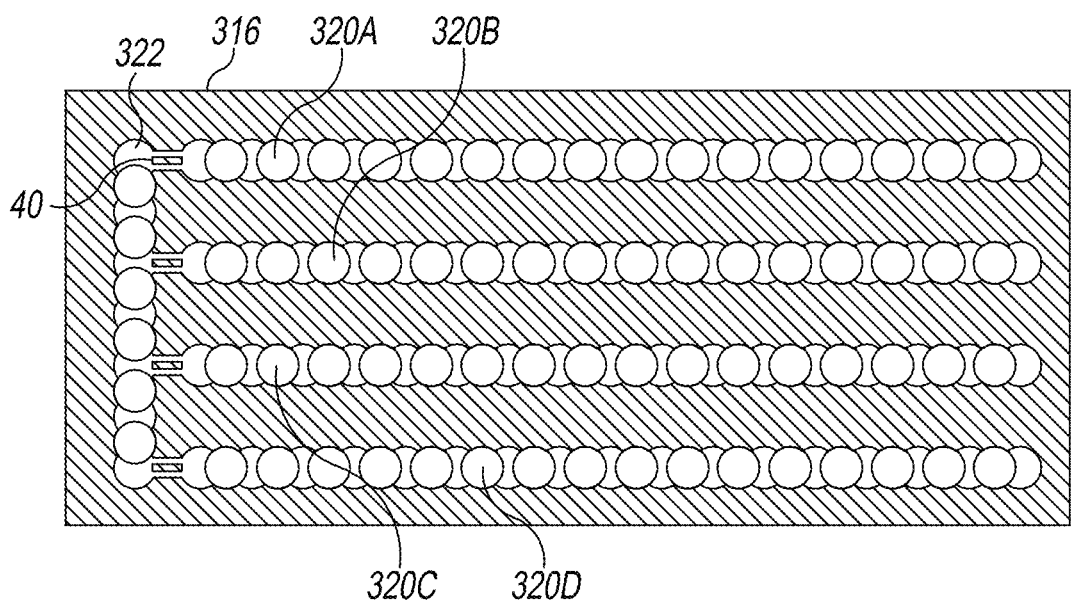
FIG. 18 is a cross-sectional top plan view of the resonator of FIG. 15.

Referring now to FIG. 14, a top plan view is shown of another embodiment of a resonator 316 which includes several cavities 320A, 320B, 320C, and 320D (see FIG. 18). Each cavity 320 is formed in a similar manner as the cavity 20, which will not be repeated in the interest of clarity. Additionally, the resonator includes a bus cavity 322 (see FIG. 18), which is formed in a similar manner as the cavity 20. Each cavity 320 is connected to the bus cavity 322 by a notch 324. FIG. 15 shows a top plan view of the resonator 316 with probe assemblies 48 which support a qubit 40 (see FIG. 17) inserted into each notch 324 between the bus cavity 322 and each cavity 320. The notch 324 acts as a port between the cavities 320, 322, allowing the inserted qubits 40 to be simultaneously coupled to each of the two cavities. FIG. 16 shows a side elevation view of the resonator 316.

Referring now to FIG. 17, a cross-sectional side elevation view of the resonator 316 shows the cavity 320D formed by the holes in the resonator 316. The cross-section also shows a hole 326 of the bus cavity 322 and the notch 324D. The notch 324D has a corresponding base inner surface 328. The superconducting qubit 40 is inserted into the notch 324D, between the cavity 320D and the bus cavity 322.

Referring now to FIG. 18, a cross-sectional top plan view of the resonator 316 shows the cavities 320 and the bus cavity 322. Each superconducting qubit 40 is inserted in the corresponding notch 324 and is coupled to each corresponding cavity 320 and the bus cavity 322. The bus cavity 322 may be configured such that the frequencies of the supported modes of the bus cavity 322 do not overlap with the frequencies of the supported modes of the cavities 320, so that waves that are present in the cavities 320 will not leak into the bus cavity 322, and vice versa. Since each of the superconducting qubits 40 can be tuned to be in resonance with the modes of the corresponding cavity 320 and with the modes of the cavity 322 and since the superconducting qubit 40 is in a position where it overlaps with the fields of the modes of the corresponding cavity 320 and the bus cavity 322, each superconducting qubit 40 is able to interact with both the corresponding cavity 320 and the bus cavity 322. It should be appreciated that the configuration of the resonator 316 allows each superconducting qubit 40 to perform one- and two-qubit operations on and between the modes of the corresponding cavity 320 as well as "read" and "write" the state of the superconducting qubit 40 to the bus cavity 322.

With those abilities, two-qubit operations can be performed between any two modes of the cavities 320 with at most two "hops," one hop from, e.g., cavity 320A into the bus cavity 322 and a second hop from the bus cavity 322 to, e.g., cavity 320B.

Figure 19:
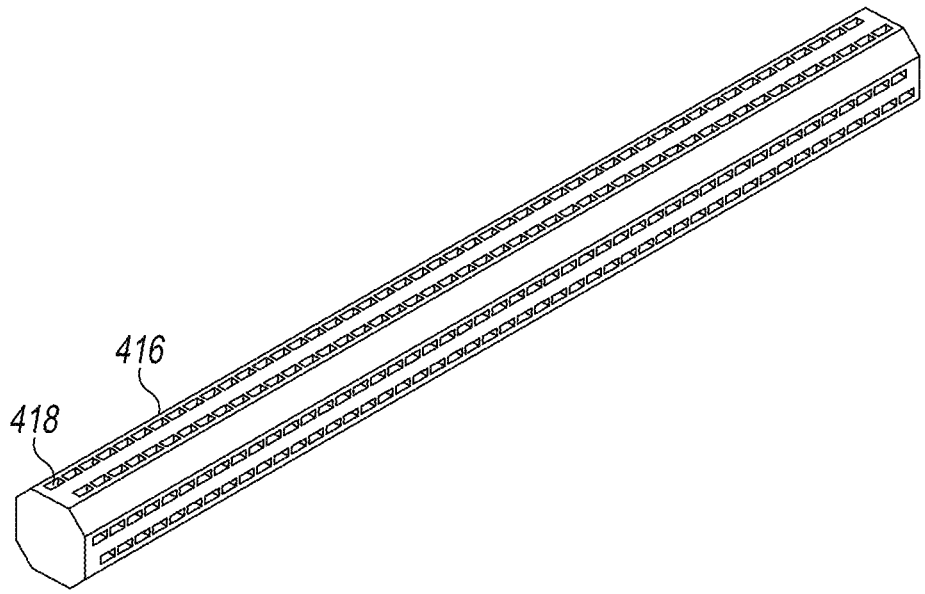
FIG. 19 is a perspective view of at least one embodiment of the resonator of FIG. 1.
Figure 20:
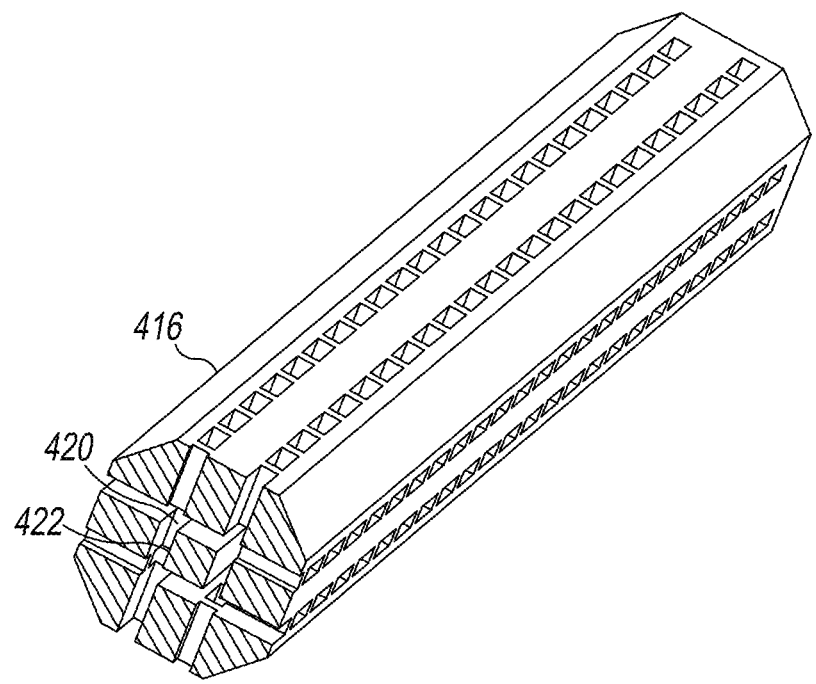
FIG. 20 is a cross-sectional perspective view of the resonator of FIG. 19.

Referring now to FIGS. 19-24, various possible embodiments of a resonator are shown. Each of the illustrative resonators in FIGS. 19-24 are formed from a monolithic block in a similar manner as the resonator 16, and each of the cavities in the resonators in FIGS. 19-24 are formed from overlapping holes in a similar manner as the cavity 20, but the cavities of the resonators in FIGS. 19-24 are formed from holes that are oriented and overlap in different way as the holes in the cavity 20, as described in more detail below. In FIG. 19, a perspective view of a resonator 416 is shown. The resonator 416 formed from a number of holes, such as the hole 418. FIG. 20 shows a cross-sectional perspective view of the resonator 416, showing the cavity 420 formed in the interior of the resonator 416. It should be appreciated that, unlike the cavity 20, the cavity 420 is a coaxial waveguide, which supports modes with a transverse electric and magnetic fields, or "TEM" modes, which may have a wavelength that is not limited by the dimensions of the cross-section (although the allowed wavelengths will still be limited by the length of the cavity).

Figure 21:
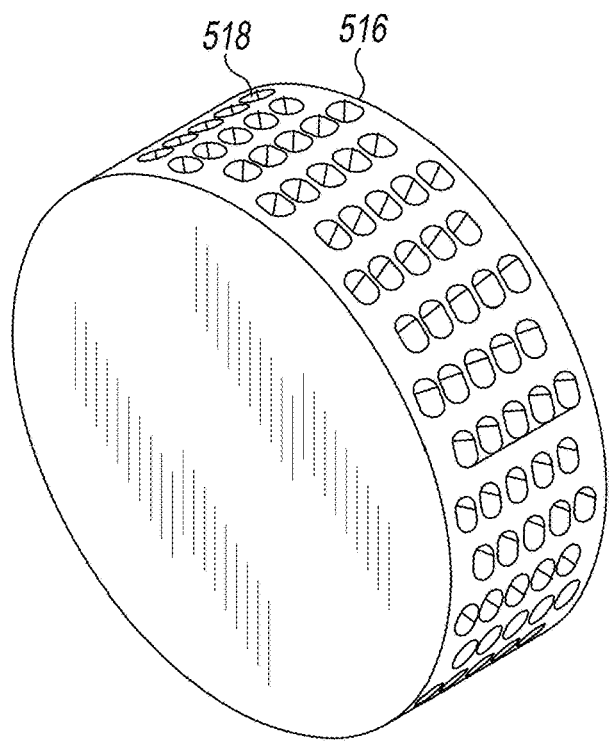
FIG. 21 is a perspective view of at least one embodiment of the resonator of FIG. 1.
Figure 22:
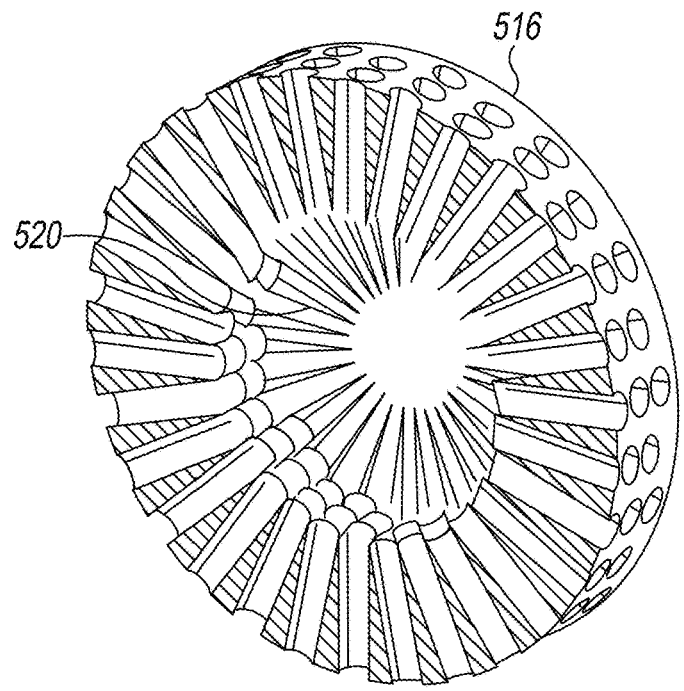
FIG. 22 is a cross-sectional perspective view of the resonator of FIG. 21.

Referring now to FIG. 21, a perspective view of an illustrative resonator 516 formed by holes such as hole 518 that extend from a cylindrical surface to a cavity 520. FIG. 22 shows a cross-sectional perspective view of the resonator 516, which shows the cavity 520.

Figure 23:
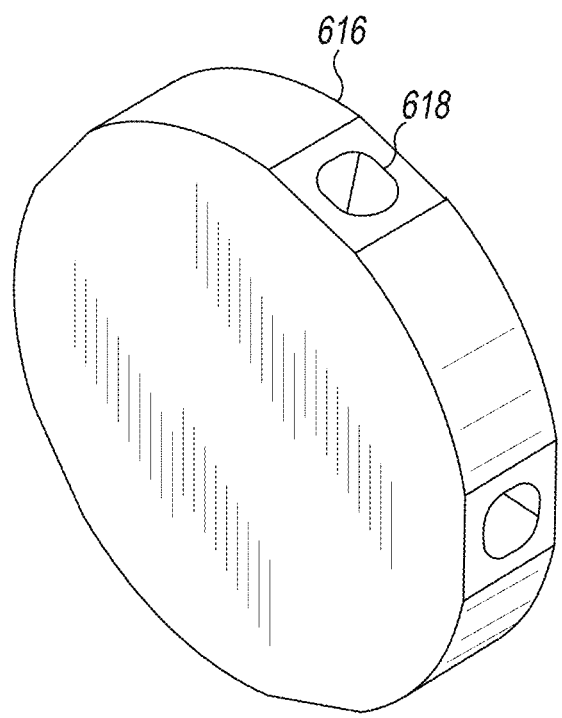
FIG. 23 is a perspective view of at least one embodiment of the resonator of FIG. 1.
Figure 24:
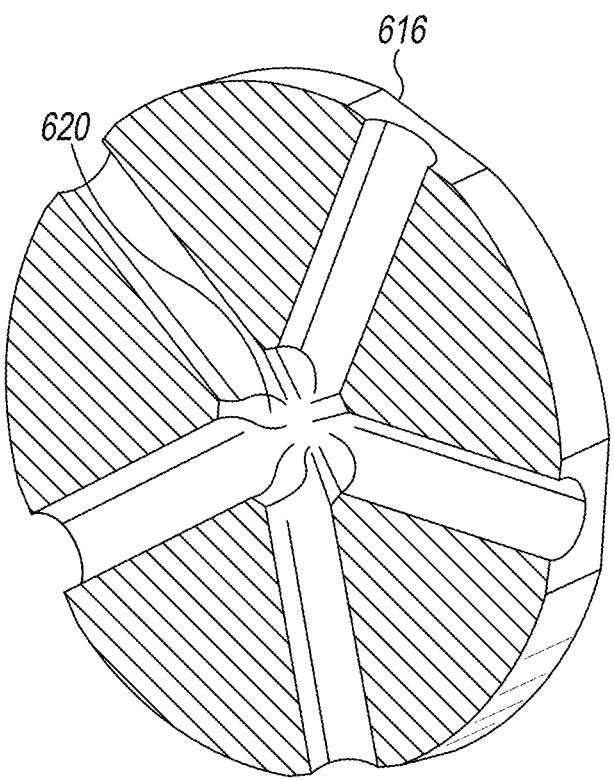
FIG. 24 is a cross-sectional perspective view of the resonator of FIG. 23.

Referring now to FIG. 23, a perspective view of an illustrative resonator 616 formed by holes such as hole 618 that extend from a cylindrical surface to a cavity 620. FIG. 24 shows a cross-sectional perspective view of the resonator 616, which shows the cavity 620.

It should be appreciated that the embodiments described above are not the only possible embodiments and that the concepts described above could be combined with various other concepts. For example, each cavity 20 and 320 may have more than one superconducting qubit 40 inserted into it. In some embodiments, other degrees of freedom of the resonator 16, 316 may be used, such as mechanical degrees of freedom including phonons, surface acoustic waves, photonic crystal modes, etc.

The invention claimed is:

1. A device for supporting a plurality of electromagnetic modes, comprising:
   a resonator comprising a monolithic block, a cavity that is defined in the monolithic block, and a port that opens into the cavity, the port being configured to receive a coupling element that is able to be coupled to the plurality of electromagnetic modes supported by the cavity, wherein the cavity is defined between a number of seamless sidewalls,
   wherein the monolithic block is at a temperature such that there is an average of less than one thermal photon in the lowest-frequency mode supported by the cavity.

2. The device of claim 1, further comprising the coupling element, wherein the coupling element is a non-linear element inserted into the port.

3. The device of claim 2, wherein the non-linear element is a superconducting qubit.

4. The device of claim 1, wherein:
   a first hole extending transverse to the cavity is defined in the monolithic block, and
   a second hole extending transverse to the cavity is defined in the monolithic block, the second hole including an inner end that overlaps with an inner end of the first hole.

5. The device of claim 1, wherein:
   a first plurality of holes extending transverse to the cavity in a first direction is defined in the monolithic block, and
   a second plurality of holes extending transverse to the cavity in a second direction different from the first direction is defined in the monolithic block, each hole of the second plurality of holes including an inner end that overlaps with an inner end of an adjacent hole of the first plurality of holes.

6. The device of claim 5, wherein the cavity extends from a first end to a second end, and a first dimension of the cavity is defined between the first end and the second end,
   wherein a depth of the first and second plurality of holes into the cavity decreases from the first end to the second end.

7. The device of claim 5, wherein:
   the cavity extends from a first end to a second end and a first dimension of the cavity is defined between the first end and the second end;
   the cavity has a second dimension that is defined at the first end orthogonal to the first dimension; and
   each of the first dimension and the second dimension is bigger than the diameter of any of the first plurality of holes or second plurality of holes.

8. The device of claim 1, wherein a quality factor of at least one of the plurality of electromagnetic modes is at least ten million.

9. The device of claim 1, wherein the resonator further comprises:
   a plurality of additional cavities;
   a bus cavity; and
   a plurality of superconducting qubits,
   wherein each superconducting qubit of the plurality of superconducting qubits is positioned such that the superconducting qubit is able to be coupled to both (i) one or more electromagnetic modes of a corresponding additional cavity of the plurality of additional cavities and (ii) one or modes of the bus cavity.

10. The device of claim 1, wherein the monolithic block is aluminum.

11. The device of claim 1, wherein the monolithic block is one of niobium, copper, titanium nitride, niobium-titanium alloy, niobium titanium nitride, indium, lead, tin, lead-tin alloy, and rhenium.

12. The device of claim 1, further comprising a film of material on the monolithic block.

13. The device of claim 12, wherein the monolithic block is oxygen-free high thermal conductivity copper and wherein the film of material is one of titanium nitride, niobium titanium nitride, indium, lead, lead-tin allow, rhenium or rhenium, gold, and copper multilayers.

14. A device for supporting electromagnetic modes comprising:
   a resonator comprising a monolithic block, a cavity that is defined in the monolithic block, and a port that opens into the cavity, the port being configured to receive a coupling element that is able to be coupled to a plurality of electromagnetic modes supported by the cavity, wherein the cavity is defined between a number of sidewalls, wherein a first plurality of holes extending transverse to the cavity in a first direction is defined in the monolithic block, and a second plurality of holes extending transverse to the cavity in a second direction different from the first direction is defined in the monolithic block, each hole of the second plurality of holes including an inner end that overlaps with an inner end of an adjacent hole of the first plurality of holes.

15. The device of claim 14, wherein the resonator further comprises:

a plurality of additional cavities;

a bus cavity; and a plurality of additional superconducting qubits, wherein each additional superconducting qubit of the plurality of superconducting qubits is positioned such that the superconducting qubit is able to be coupled to both (i) one or more electromagnetic modes of a corresponding additional cavity of the plurality of additional cavities and (ii) one or modes of the bus cavity.

16. The device of claim 14, wherein a quality factor of at least one of the electromagnetic modes of the plurality of electromagnetic waves is at least ten million.

17. A system for supporting electromagnetic modes in a plurality of cavities, the system comprising:

one or more resonators comprising the plurality of cavities defined in the one or more resonators and a bus cavity defined in the one or more resonators, wherein each of the plurality of cavities and the bus cavity support a corresponding plurality of electromagnetic modes;

a plurality of non-linear elements, wherein each non-linear element of the plurality of non-linear elements is coupled to one of the plurality of cavities and to the bus cavity, wherein a frequency of each of the plurality of electromagnetic modes of the bus cavity does not overlap with a frequency of any of the electromagnetic modes of the pluralities of electromagnetic modes of the plurality of cavities.

18. The system of claim 17, wherein a quality factor of at least one of the plurality of electromagnetic modes of at least one of the plurality of cavities is at least ten million.

19. The system of claim 17, wherein the one or more resonators comprises one resonator comprising a monolithic block, wherein each of the plurality of cavities and the bus cavity is defined in the monolithic block.

20. The system of claim 17, wherein each of the one or more resonators is at a temperature such that there is an average of less than one thermal photon in the lowest-frequency mode supported by the cavity.

* * * * *